US011647505B2

(12) United States Patent
Lin et al.

(10) Patent No.: US 11,647,505 B2
(45) Date of Patent: *May 9, 2023

(54) UPLINK SIGNAL TRANSMISSION METHOD AND DEVICE

(71) Applicant: GUANGDONG OPPO MOBILE TELECOMMUNICATIONS CORP., LTD., Guangdong (CN)

(72) Inventors: Yanan Lin, Guangdong (CN); Hua Xu, Ottawa (CA); Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,172

(22) Filed: Aug. 30, 2021

(65) Prior Publication Data

US 2021/0392639 A1    Dec. 16, 2021

Related U.S. Application Data

(63) Continuation of application No. 16/349,045, filed as application No. PCT/CN2016/106154 on Nov. 16, 2016, now Pat. No. 11,129,147.

(51) Int. Cl.
*H04W 72/04* (2023.01)
*H04L 1/1829* (2023.01)
(Continued)

(52) U.S. Cl.
CPC ....... *H04W 72/0413* (2013.01); *H04L 1/1861* (2013.01); *H04L 5/0007* (2013.01);
(Continued)

(58) Field of Classification Search
CPC ............. H04W 72/0413; H04W 72/00; H04W 72/1257; H04W 72/1278; H04L 1/1861;
(Continued)

(56) References Cited

U.S. PATENT DOCUMENTS 7,940,867 B1    5/2011  Wasily
8,139,665 B2    3/2012  Choi
(Continued)

FOREIGN PATENT DOCUMENTS

CN          1812386 A    8/2006
CN        102158459 A    8/2011
(Continued)

OTHER PUBLICATIONS

International Search Report in international application No. PCT/CN2016/106154, dated Mar. 29, 2017.
(Continued)

*Primary Examiner* — Jay P Patel

(57) ABSTRACT

Provided are an uplink signal transmission method and device. The method comprises: a network device determining a physical resource used, in a time domain scheduling unit, for transmitting an uplink control signal; and the network device receiving the uplink control signal on the physical resource used for transmitting an uplink control signal, wherein the uplink control signal is transmitted by using a cyclic prefix-orthogonal frequency division multiplexing (CP-OFDM) waveform. In the embodiments of the present invention, an uplink control signal is transmitted by using a CP-OFDM waveform, and by using multi-carrier transmission characteristics, the uplink control signal may be configured with continuous or discontinuous physical resources in a frequency domain, so that the problem, in the prior art, where an uplink control signal must be mapped to continuous physical resources in a frequency domain when (Continued)

using a single carrier to perform uplink transmission on the uplink control signal is prevented, thereby improving the flexibility of configuring a physical resource for an uplink control signal.

20 Claims, 6 Drawing Sheets

(51) Int. Cl.
| | |
|---|---|
| *H04L 27/26* | (2006.01) |
| *H04L 5/00* | (2006.01) |
| *H04W 72/00* | (2023.01) |

(52) U.S. Cl.
CPC .......... *H04L 5/0048* (2013.01); *H04L 5/0057* (2013.01); *H04L 5/0094* (2013.01); *H04L 27/2605* (2013.01); *H04W 72/00* (2013.01)

(58) Field of Classification Search
CPC ... H04L 5/0007; H04L 5/0048; H04L 5/0057; H04L 5/0094; H04L 27/2605; H04L 5/0053; H04L 5/0092
See application file for complete search history.

(56) References Cited

U.S. PATENT DOCUMENTS

| | | | |
|---|---|---|---|
| 8,311,134 | B2 | 11/2012 | Zhang |
| 9,843,468 | B2* | 12/2017 | Li .............................. H04L 5/006 |
| 10,111,190 | B2 | 10/2018 | Pelletier et al. |
| 10,396,876 | B2* | 8/2019 | Lee ........................ H04L 1/1812 |
| 11,012,124 | B2* | 5/2021 | Lou ......................... H04B 7/0619 |
| 2010/0195566 | A1 | 8/2010 | Krishnamurthy |
| 2011/0205968 | A1* | 8/2011 | Kim ..................... H04W 72/085 370/328 |
| 2014/0044204 | A1* | 2/2014 | Li ......................... H04L 5/1469 375/260 |
| 2015/0016339 | A1* | 1/2015 | You ................... H04W 56/0015 370/328 |
| 2015/0036618 | A1 | 2/2015 | Xu et al. |
| 2015/0055588 | A1* | 2/2015 | Yerramalli .............. H04L 5/005 370/329 |
| 2016/0065338 | A1* | 3/2016 | Kim ...................... H04L 5/0048 370/330 |
| 2017/0311296 | A1 | 10/2017 | Onggosanusi et al. |
| 2017/0325216 | A1 | 11/2017 | Nogami et al. |
| 2018/0049173 | A1 | 2/2018 | Chen et al. |
| 2018/0110042 | A1 | 4/2018 | Chen et al. |
| 2018/0116000 | A1 | 4/2018 | Ly et al. |
| 2018/0124710 | A1 | 5/2018 | Ly et al. |
| 2018/0241453 | A1* | 8/2018 | Lee ........................ H04L 1/0028 |
| 2018/0270722 | A1* | 9/2018 | Kim ....................... H04W 36/08 |
| 2018/0323934 | A1* | 11/2018 | Suzuki ................... H04B 17/24 |
| 2019/0013980 | A1* | 1/2019 | Gao ......................... H04L 5/00 |
| 2019/0014548 | A1 | 1/2019 | Pelletier et al. |
| 2019/0089498 | A1 | 3/2019 | Pelletier et al. |
| 2019/0141555 | A1* | 5/2019 | Tooher .................. H04L 5/0057 |
| 2019/0141696 | A1 | 5/2019 | Kim et al. |
| 2019/0173546 | A1* | 6/2019 | Kim ..................... H04L 27/2607 |
| 2019/0229789 | A1 | 7/2019 | Zhang et al. |
| 2019/0261380 | A1 | 8/2019 | Iyer et al. |
| 2019/0280802 | A1* | 9/2019 | Ma .......................... H04L 1/008 |
| 2019/0373524 | A1* | 12/2019 | Kim ........................ H04W 4/46 |
| 2020/0145079 | A1 | 5/2020 | Marinier et al. |
| 2020/0288458 | A1 | 9/2020 | Takeda et al. |
| 2021/0028831 | A1* | 1/2021 | Lou ....................... H04B 7/0619 |
| 2021/0273688 | A1* | 9/2021 | Lou ....................... H04B 7/0417 |

FOREIGN PATENT DOCUMENTS

| | | | | |
|---|---|---|---|---|
| CN | 102378373 | A | 3/2012 | |
| CN | 104205973 | A | 12/2014 | |
| EP | 2378671 | A1 * | 10/2011 | ........... H04L 5/0007 |
| EP | 2883381 | B1 * | 1/2020 | ........... H04B 7/0408 |
| RU | 2419233 | C2 | 5/2011 | |
| RU | 2446635 | C2 | 3/2012 | |
| WO | WO-2012111975 | A2 * | 8/2012 | ........... H04L 1/0026 |
| WO | 2016105570 | A1 | 6/2016 | |
| WO | 2018031251 | A1 | 2/2018 | |
| WO | 2018081975 | A1 | 5/2018 | |

OTHER PUBLICATIONS

Written Opinion of the International Search Authority in international application No. PCT/CN2016/106154, dated Mar. 29, 2017.
Qualcomm, "WF on Waveform for NR Uplink", 3GPP TSG-RAN WG1 #86bis R1-1610485, Oct. 18, 2016 (OCt. 18, 2016), p. 4.
Intel Corporation, "Resource Allocation for NR Uplink Control Channel", 3GPP TSG-RAN WG1 #86bis R1-1609538, Oct. 1, 2016 (Oct. 1, 2016), section 2.
Supplementary European Search Report in the European application No. 16921895.5, dated Sep. 11, 2019.
Samsung: "Discussion on UCI and data multiplexing", 3GPP DRAFT; R1-1612530 UCI and Data Multiplexing-Samsung, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016(Nov. 13, 2016), XP051176477.
Nokia Alcatel-Lucent Shanghai Bell: "On the PUCCH Structure for NR", 3GPP DRAFT; R1-1612238 PUCCH Design Final, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051176187.
First Office Action of the Chilean application No. 201901326, dated Mar. 2, 2020.
Notice of Allowance of the Russian application No. 2019118675, dated Mar. 26, 2020.
First Office Action of the Chinese application No. 201680090607.0, dated Apr. 29, 2020.
First Office Action of the Canadian application No. 3042446, dated May 6, 2020.
Written Opinion of the Singaporean application No. 11201904001P, dated Jun. 2, 2020.
First Office Action of the European application No. 16921895.5, dated Jun. 16, 2020.
Second Office Action of the Chilean application No. 201901326, dated Jul. 22, 2020.
Intel Corporation, "UCI embedding onto UL data channels", 3GPP TSG RAN WG1 Meeting #87 R1-1611999, Reno, USA, Nov. 14-18, 2016.
Second Office Action of the Chinese application No. 201680090607.0, dated Aug. 12, 2020.
First Office Action of the Brazilian application No. BR1120190097228, dated Sep. 15, 2020.
Nokia, Alcatel-Lucent Shanghai Bell, UCI multiplexing in the presence of UL data [online], 3GPP TSG RAN WG1 #87 R1-1612239, Nov. 5, 2016.
Office Action of the Indian application No. 201917019928, dated Oct. 30, 2020.
First Office Action of the Japanese application No. 2019-524996, dated Nov. 13, 2020.
Second Office Action of the Canadian application No. 3042446, dated Jan. 12, 2021.
First Office Action of the Israeli application No. 266366, dated Dec. 9, 2020.
First Office Action of the Taiwanese application No. 106138062, dated Jan. 27, 2021.
Supplementary European Search Report in the European application No. 21166630.0, dated May 6, 2021.
Second Office Action of the Japanese application No. 2019-524996, dated Jul. 16, 2021.
First Office Action of the U.S. Appl. No. 16/349,045, dated Sep. 16, 2020.
Final Office Action of the U.S. Appl. No. 16/349,045, dated Mar. 10, 2021.

(56) References Cited

OTHER PUBLICATIONS

Notice of Allowance of the U.S. Appl. No. 16/349,045, dated May 19, 2021.
Notice of Corrected Allowance of the U.S. Appl. No. 16/349,045, dated Aug. 19, 2021.
First Office Action of the Mexican application No. MX/a/2019/005663, dated Jun. 23, 2022.
Second Office Action of the Australian application No. 2016429558, dated Jan. 14, 2022.
Notice of Allowance of the Australian application No. 2016429558, dated Mar. 30, 2022.
Third Office Action of the Canadian application No. 3042446, dated Oct. 13, 2021.
Office Action of the Australian application No. 2016429558, dated Sep. 16, 2021.
First Office Action of the Vietnamese application No. 1-2019-02820, dated Nov. 30, 2022.

\* cited by examiner

UPLINK SIGNAL TRANSMISSION METHOD AND DEVICE

This application is a continuation of U.S. application Ser. No. 16/349,045, filed May 10, 2019, which was a National Stage of International Application No. PCT/CN2016/106154, filed Nov. 16, 2016, the entireties of which are hereby incorporated herein by reference.

TECHNICAL FIELD

Embodiments of the disclosure relate to the field of communication, and more particularly to a method and device for transmitting an uplink signal.

BACKGROUND

In the present Long Term Evolution (LTE) communication system, a single-carrier transmission manner is adopted for uplink transmission, and uplink transmission is implemented mainly through a Discrete Fourier Transform-Spreading-Frequency Division Multiple Access (DFT-S-FDMA) waveform. A main characteristic of the single-carrier transmission manner is that a Peak to Average Power Ratio (PAPR) is relatively low. That is, during uplink signal transmission between a terminal and a network device, the terminal may use relatively high power without worrying about that peak power may exceed the maximum transmitting power supported by the terminal. In the single-carrier uplink transmission manner, the transmitting power of the terminal may be conveniently improved to improve transmission quality of uplink transmission and extend coverage of the uplink transmission.

However, when the single-carrier transmission manner is adopted to transmit an uplink signal, physical resources for transmitting uplink data are required to be continuous in frequency domain to meet characteristics of the single-carrier transmission manner From the above, when physical resource configuration manner for single-carrier transmission is adopted for transmitting uplink signals, uplink signals of only one type may be transmitted on a whole allocated frequency-domain physical resource in a time-domain scheduling unit (for example, a slot), so that flexibility of uplink signal transmission is limited.

SUMMARY

The embodiments of the disclosure provide a method and device for transmitting an uplink signal, so as to improve flexibility in physical resource configuration for an uplink control signal.

A first aspect provides a method for transmitting an uplink control signal, which may include that: a network device determines a physical resource for transmitting an uplink control signal in a time-domain scheduling unit; and the network device receives the uplink control signal on the physical resource for transmitting the uplink control signal, the uplink control signal being transmitted by use of a Cyclic Prefix-Orthogonal Frequency Division Multiplexing (CP-OFDM) waveform.

In the embodiments of the disclosure, the uplink control signal is transmitted by use of the CP-OFDM waveform, and the physical resource which are continuous or discontinuous in frequency domain may be configured for the uplink control signal by use of a multi-carrier transmission characteristic, so that the condition in a conventional art that the uplink control signal is required to be mapped onto a physical resource which are continuous in the frequency domain during uplink transmission of the uplink control signal by use of a single carrier is avoided, and thus flexibility in physical resource configuration for the uplink control signal is improved.

In combination with the first aspect, in a possible implementation mode of the first aspect, the physical resource for transmitting the uplink control signal in the time-domain scheduling unit may include at least one physical resource region and different physical resource regions may be used to transmit uplink control signals of different types.

In the time-domain scheduling unit, the at least one physical resource region is configured for transmitting the uplink control signal, and the uplink control signals of different types are transmitted in different physical resource regions, so that the uplink control signals of multiple different types may be simultaneously transmitted on the physical resource in the time-domain scheduling unit, and thus flexibility of the uplink control signal transmission is improved.

In combination with the first aspect or any abovementioned possible implementation mode, in a possible implementation mode of the first aspect, each of the at least one physical resource region may consist of at least one frequency-domain Resource Block (RB) in frequency domain.

In combination with the first aspect or any abovementioned possible implementation mode, in a possible implementation mode of the first aspect, the uplink control signal may include uplink control signals of different types, the physical resource for transmitting the uplink control signal may be one RB, the RB may include the at least one physical resource region, and different physical resource regions may be used to transmit the uplink control signals of different types.

The RB is divided into multiple physical resource regions to implement simultaneous transmission of the uplink control signals of multiple different types through one RB, so that flexibility of the uplink control signal transmission is improved.

In combination with the first aspect or any abovementioned possible implementation mode, in a possible implementation mode of the first aspect, the at least one physical resource region may include a first physical resource region, and a first Orthogonal Frequency Division Multiplexing (OFDM) symbol of the first physical resource region in time domain may be a starting OFDM symbol in the time-domain scheduling unit.

The first OFDM symbol of the first physical resource region is configured to be a first OFDM symbol of the physical resource for transmitting the uplink control signal, so that the uplink control signal transmitted in the first physical resource region may be transmitted relatively sooner.

In combination with the first aspect or any abovementioned possible implementation mode, in a possible implementation mode of the first aspect, the at least one physical resource region may further include a second physical resource region, and the second physical resource region and the first physical resource region may be continuous in the time domain.

The second physical resource transmission region is configured on the physical resource for transmitting the uplink control signal to implement transmission of the uplink control signals of multiple different types in the time-domain scheduling unit, and meanwhile, the second physical resource region and the first physical resource region are continuous in the time domain, so that a utilization rate of the physical resource for transmitting the uplink control signal may be increased.

In combination with the first aspect or any abovementioned possible implementation mode, in a possible implementation mode of the first aspect, the at least one physical resource region may include a third physical resource region, and a last OFDM symbol of the third physical resource region in the time domain may be a last OFDM symbol in the time-domain scheduling unit.

The third physical resource region is configured on the physical resource for transmitting the uplink control signal to implement transmission of the uplink control signals of multiple different types in the time-domain scheduling unit, so that flexibility of the uplink control signal transmission is improved.

In combination with the first aspect or any abovementioned possible implementation mode, in a possible implementation mode of the first aspect, the method may further include that: the network device determines a physical resource used by a terminal for transmitting reference signals in the time-domain scheduling unit, the physical resource for transmitting the reference signals being configured in one of the at least one physical resource region.

In one of the at least one physical resource region, the physical resource is configured for the uplink control signal and, meanwhile, the physical resource is also configured for the reference signals, so that flexibility in physical resource configuration for the uplink signals (which may include the uplink control signal and the reference signals) may be improved.

In combination with the first aspect or any abovementioned possible implementation mode, in a possible implementation mode of the first aspect, the physical resources for transmitting the reference signals may be distributed in the frequency domain or the time domain, or the physical resources for transmitting the reference signals may be continuous in the frequency domain or the time domain.

The physical resources for transmitting the reference signals may be distributed in the frequency domain or the time domain or continuous in the frequency domain or the time domain, so that flexibility in physical resource configuration for the reference signal is improved.

In combination with the first aspect or any abovementioned possible implementation mode, in a possible implementation mode of the first aspect, the uplink control signal may include multiple Acknowledgement (ACK)/Negative Acknowledgement (NACK) signals, in the first physical resource region, physical resources for transmitting the multiple ACK/NACK signals and physical resources for transmitting the reference signals may not be overlapped, and physical resources in a resource group for transmitting the multiple ACK/NACK signals and the physical resources for transmitting the reference signals may be staggered and continuously arranged in a same OFDM symbol.

Both the physical resources for transmitting the ACK/NACK signals and the reference signals are configured in the first physical resource region, and then the network device may simultaneously acquire the ACK/NACK signals and the reference signals in the first physical resource region, and demodulate the ACK/NACK signals through the reference signals to determine contents of the ACK/NACK signals, so that a transmission and demodulation rate of the ACK/NACK signals is increased and thus a data transmission rate is increased.

In combination with the first aspect or any abovementioned possible implementation mode, in a possible implementation mode of the first aspect, the multiple ACK/NACK signals may be superposed and mapped onto the resource group for transmitting the multiple ACK/NACK signals after being extended by use of different orthogonal or pseudo-orthogonal sequences with a same length respectively.

In combination with the first aspect or any abovementioned possible implementation mode, in a possible implementation mode of the first aspect, the uplink control signal may further include a Channel State Information (CSI) feedback signal, in the second physical resource transmission region, a physical resource for transmitting the CSI feedback signal and the physical resources for transmitting the reference signals may not be overlapped, and physical resources in a resource group for transmitting the reference signals may be continuous in the time domain.

The physical resources for transmitting the reference signals are configured in the second physical resource transmission region, so that flexibility of the uplink signal transmission is improved.

Alternatively, the uplink control signal further includes the CSI feedback signal, in the second physical resource transmission region, a physical resource for transmitting the CSI feedback signal and physical resources for transmitting the reference signals are not overlapped, the physical resources in the resource group for transmitting the reference signals are continuous in the time domain and the ACK/NACK signals are transmitted in the first physical resource region.

The physical resource for transmitting the reference signals is configured in the second physical resource region, then the physical resource for the reference signals is not configured in the first physical resource region, and the uplink control signal is transmitted by use of the whole first physical resource region, so that a coverage rate the first physical resource region for transmitting the uplink control signal is increased.

In combination with the first aspect or any abovementioned possible implementation mode, in a possible implementation mode of the first aspect, in the first physical resource region, the multiple ACK/NACK signals may be repeatedly mapped, for a transmission times of the multiple ACK/NACK signals, onto resource groups at different positions, after being extended and superposed by use of different orthogonal or pseudo-orthogonal sequences with a same length respectively, and the resource groups may include the physical resources for transmitting the multiple ACK/NACK signals.

In combination with the first aspect or any abovementioned possible implementation mode, in a possible implementation mode of the first aspect, the uplink control signal may include the multiple ACK/NACK signals, in the third physical resource region, the physical resources for transmitting the multiple ACK/NACK signals and the physical resources for transmitting the reference signals may not be overlapped, and the physical resources in the resource group for transmitting the multiple ACK/NACK signals and the physical resources for transmitting the reference signals may be staggered and continuously arranged in a same OFDM symbol.

Both the physical resources for transmitting the ACK/NACK signals and the reference signals are configured in the third physical resource region, and then the network device may simultaneously acquire the ACK/NACK signals and the reference signals in the third physical resource region, and demodulate the ACK/NACK signals through the reference signals to determine the contents of the ACK/

NACK signals, so that the transmission and demodulation rate of the ACK/NACK signals is increased and thus the data transmission rate is increased.

In combination with the first aspect or any abovementioned possible implementation mode, in a possible implementation mode of the first aspect, in the third physical resource transmission region, the multiple ACK/NACK signals may be repeatedly mapped, for the transmission times of the multiple ACK/NACK signals, onto resource groups at different positions, after being extended and superposed by use of different orthogonal or pseudo-orthogonal sequences with a same length respectively, and the resource groups may include the physical resources for transmitting the multiple ACK/NACK signals.

In combination with the first aspect or any abovementioned possible implementation mode, in a possible implementation mode of the first aspect, the multiple ACK/NACK signals may correspond to downlink data blocks in different time-domain scheduling units respectively, or the multiple ACK/NACK signals may correspond to different codewords of a same downlink data block.

In combination with the first aspect or any abovementioned possible implementation mode, in a possible implementation mode of the first aspect, before the operation that the network device receives the uplink control signal on the physical resource for transmitting the uplink control signal, the method may further include that: the network device transmits indication information to the terminal, the indication information being used to indicate the physical resource for transmitting the uplink control signal in the time-domain scheduling unit.

In combination with the first aspect or any abovementioned possible implementation mode, in a possible implementation mode of the first aspect, the operation that the network device transmits the indication information to the terminal, the indication information being used to indicate the physical resource for transmitting the uplink control signal in the time-domain scheduling unit, may include that: the network device transmits the indication information to the terminal, the indication information being used to indicate frequency-domain resource configuration and time-domain resource configuration of the physical resource for transmitting the uplink control signal in the time-domain scheduling unit.

In combination with the first aspect or any abovementioned possible implementation mode, in a possible implementation mode of the first aspect, the indication information may further be used to indicate a physical resource used by the terminal for transmitting uplink data in the time-domain scheduling unit.

In combination with the first aspect or any abovementioned possible implementation mode, in a possible implementation mode of the first aspect, the operation that the network device transmits the indication information to the terminal may include that: the network device transmits high-layer signaling or physical-layer signaling to the terminal, the high-layer signaling or the physical-layer signaling carrying the indication information.

In combination with the first aspect or any abovementioned possible implementation mode, in a possible implementation mode of the first aspect, the method may further include that: the network device determines at least one of a transmission times needed for transmission of the uplink control signal or a length of an extended sequence of the uplink control signal; and the network device indicates the at least one of the transmission times needed for transmission of the uplink control signal or the length of the extended sequence of the uplink control signal to the terminal.

The network device indicates the transmission times needed for transmission of the uplink control signal and the length of the extended sequence of the uplink control signal to the terminal, so that the coverage rate for transmitting the uplink control signal is increased.

In combination with the first aspect or any abovementioned possible implementation mode, in a possible implementation mode of the first aspect, the operation that the network device indicates the at least one of the transmission times needed for transmission of the uplink control signal or the length of the extended sequence of the uplink control signal to the terminal may include that: the network device transmits a length of a sequence of the uplink control signal to the terminal; and the network device transmits a number of the physical resource for transmitting the uplink control signal to the terminal.

In combination with the first aspect or any abovementioned possible implementation mode, in a possible implementation mode of the first aspect, the operation that the network device indicates the at least one of the transmission times needed for transmission of the uplink control signal or the length of the extended sequence of the uplink control signal to the terminal may include that: the network device transmits Downlink Control Information (DCI) to the terminal, the DCI carrying the at least one of the transmission times needed for transmission of the uplink control signal or the length of the extended sequence of the uplink control signal.

In combination with the first aspect or any abovementioned possible implementation mode, in a possible implementation mode of the first aspect, the operation that the network device indicates the at least one of the transmission times needed for transmission of the uplink control signal or the length of the extended sequence of the uplink control signal to the terminal may include that: the network device transmits high-layer signaling to the terminal, the high-layer signaling carrying at least one of a transmission times needed for transmission of a first-type uplink signal or a length of an extended sequence of the first-type uplink signal.

A second aspect provides an method for transmitting an uplink control signal, which may include that: a terminal determines a physical resource for transmitting an uplink control signal in a time-domain scheduling unit; and the terminal transmits the uplink control signal to a network device on the physical resource for transmitting the uplink control signal, the uplink control signal being transmitted by use of a CP-OFDM waveform.

In the embodiments of the disclosure, the uplink control signal is transmitted by use of the CP-OFDM waveform, and the physical resource which are continuous or discontinuous in frequency domain may be configured for the uplink control signal by use of a multi-carrier transmission characteristic, so that the condition in a conventional art that the uplink control signal is required to be mapped onto a physical resource which are continuous in the frequency domain during uplink transmission of the uplink control signal by use of a single carrier is avoided, and thus flexibility in physical resource configuration for the uplink control signal is improved.

In combination with the second aspect, in a possible implementation mode of the second aspect, the physical resource for transmitting the uplink control signal in the time-domain scheduling unit may include at least one physical resource region and different physical resource regions may be used to transmit uplink control signals of different types.

In the time-domain scheduling unit, the at least one physical resource region is configured for transmitting the uplink control signal, and the uplink control signals of different types are transmitted in different physical resource regions, so that the uplink control signals of multiple different types may be simultaneously transmitted on the physical resource in the time-domain scheduling unit, and flexibility of the uplink control signal transmission is improved.

In combination with the second aspect or any abovementioned possible implementation mode, in a possible implementation mode of the second aspect, each of the at least one physical resource region may consist of at least one frequency-domain RB in frequency domain.

In combination with the second aspect or any abovementioned possible implementation mode, in a possible implementation mode of the second aspect, the uplink control signal may include uplink control signals of different types, the physical resource for transmitting the uplink control signal may be one RB, the RB may include the at least one physical resource region and different physical resource regions may be used to transmit the uplink control signals of different types.

The RB is divided into multiple physical resource regions to implement simultaneous transmission of the uplink control signals of multiple different types through the RB, so that the uplink control signal transmission flexibility is improved.

In combination with the second aspect or any abovementioned possible implementation mode, in a possible implementation mode of the second aspect, the at least one physical resource region may include a first physical resource region, and a first OFDM symbol of the first physical resource region in time domain may be a starting OFDM symbol in the time-domain scheduling unit.

The first OFDM symbol of the first physical resource region is configured to be a first OFDM symbol of the physical resource for transmitting the uplink control signal, so that the uplink control signal transmitted in the first physical resource region may be transmitted relatively sooner.

In combination with the second aspect or any abovementioned possible implementation mode, in a possible implementation mode of the second aspect, the at least one physical resource region may further include a second physical resource region, and the second physical resource region and the first physical resource region may be continuous in the time domain.

The second physical resource transmission region is configured on the physical resource for transmitting the uplink control signal to implement transmission of the uplink control signals of multiple different types in the time-domain scheduling unit, and meanwhile, the second physical resource region and the first physical resource region are continuous in the time domain, so that a utilization rate of the physical resource for transmitting the uplink control signal may be increased.

In combination with the second aspect or any abovementioned possible implementation mode, in a possible implementation mode of the second aspect, the at least one physical resource region may include a third physical resource region, and a last OFDM symbol of the third physical resource region in the time domain may be a last OFDM symbol in the time-domain scheduling unit.

The third physical resource region is configured on the physical resource for transmitting the uplink control signal to implement transmission of the uplink control signals of multiple different types in the time-domain scheduling unit, so that flexibility of the uplink control signal transmission is improved.

In combination with the second aspect or any abovementioned possible implementation mode, in a possible implementation mode of the second aspect, a physical resource for transmitting reference signals may be configured in one of the at least one physical resource region.

In one of the at least one physical resource region, the physical resource is configured for the uplink control signal and, meanwhile, the physical resource is also configured for the reference signals, so that flexibility in physical resource configuration for the uplink signals (which may include the uplink control signal and the reference signal) may be improved.

In combination with the second aspect or any abovementioned possible implementation mode, in a possible implementation mode of the second aspect, the physical resources for transmitting the reference signals may be distributed in the frequency domain or the time domain, or the physical resources for transmitting the reference signals may be continuous in the frequency domain or the time domain.

The physical resources for transmitting the reference signals may be distributed in the frequency domain or the time domain, or may be continuous in the frequency domain or the time domain, so that flexibility in physical resource configuration for the reference signals is improved.

In combination with the second aspect or any abovementioned possible implementation mode, in a possible implementation mode of the second aspect, the uplink control signal may include multiple ACK/NACK signals, in the first physical resource region, physical resources for transmitting the multiple ACK/NACK signals and the physical resources for transmitting the reference signals may not be overlapped, and physical resources in a resource group for transmitting the multiple ACK/NACK signals and the physical resources for transmitting the reference signals may be staggered and continuously arranged in a same OFDM symbol.

Both the physical resources for transmitting the ACK/NACK signals and the reference signals are configured in the first physical resource region, and then the network device may simultaneously acquire the ACK/NACK signals and the reference signals in the first physical resource region, and demodulate the ACK/NACK signals through the reference signals to determine contents of the ACK/NACK signals, so that a transmission and demodulation rate of the ACK/NACK signals is increased and a data transmission rate is further increased.

In combination with the second aspect or any abovementioned possible implementation mode, in a possible implementation mode of the second aspect, before the operation that the terminal transmits the uplink control signal to the network device on the physical resource for transmitting the uplink control signal, the method may further include the following step: the terminal extends the multiple ACK/NACK signals by use of different orthogonal or pseudo-orthogonal sequences with a same length, and maps and superposes the extended sequences into the resource group.

In combination with the second aspect or any abovementioned possible implementation mode, in a possible implementation mode of the second aspect, the uplink control signal may further include a CSI feedback signal, in the second physical resource transmission region, a physical resource for transmitting the CSI feedback signal and the physical resources for transmitting the reference signals may not be overlapped, and the physical resources in a resource group for transmitting the reference signals may be continuous in the time domain.

The physical resource for transmitting the reference signals is configured in the second physical resource transmission region, so that flexibility of the uplink signal transmission is improved.

Alternatively, the uplink control signal further includes the CSI feedback signal, in the second physical resource transmission region, the physical resources for transmitting the CSI feedback signal and the physical resources for transmitting the reference signals are not overlapped, the physical resources in the resource group for transmitting the reference signals are continuous in the time domain, and the ACK/NACK signals are transmitted in the first physical resource region.

The physical resource for transmitting the reference signals is configured in the second physical resource region, then the physical resource is not configured for the reference signals in the first physical resource region and the uplink control signal is transmitted by use of the whole first physical resource region, so that a coverage rate of the first physical resource region for transmitting the uplink control signal is increased.

In combination with the second aspect or any abovementioned possible implementation mode, in a possible implementation mode of the second aspect, before the operation that the terminal transmits the uplink control signal to the network device by use of the physical resource for transmitting the uplink control signal, the method may further include that: the terminal extends the multiple ACK/NACK signals by use of different orthogonal or pseudo-orthogonal sequences with a same length and repeatedly maps the extended sequences onto the resource groups at different positions for a transmission times of the multiple ACK/NACK signals, the resource group including the physical resources for transmitting the multiple ACK/NACK signals.

In combination with the second aspect or any abovementioned possible implementation mode, in a possible implementation mode of the second aspect, the uplink control signal may include the multiple ACK/NACK signals, the physical resources for transmitting the multiple ACK/NACK signals, and in the third physical resource region, physical resources for transmitting the reference signals may not be overlapped, and the physical resources in the resource group for transmitting the multiple ACK/NACK signals and the physical resources for transmitting the reference signals may be staggered and continuously arranged in a same OFDM symbol.

The physical resources for transmitting the ACK/NACK signals and the reference signals are both configured in the third physical resource region, and then the network device may simultaneously acquire the ACK/NACK signals and the reference signals in the third physical resource region, and demodulate the ACK/NACK signals through the reference signals to determine the contents of the ACK/NACK signals, so that the transmission and demodulation rate of the ACK/NACK signals is increased and the data transmission rate is further increased.

In combination with the second aspect or any abovementioned possible implementation mode, in a possible implementation mode of the second aspect, in the third physical resource transmission region, the multiple ACK/NACK signals may be repeatedly mapped, for the transmission times of the multiple ACK/NACK signals, onto resource groups at different positions, after being extended and superposed by use of different orthogonal or pseudo-orthogonal sequences with a same length respectively, and the resource group may include the physical resources for transmitting the multiple ACK/NACK signals.

In combination with the second aspect or any abovementioned possible implementation mode, in a possible implementation mode of the second aspect, the multiple ACK/NACK signals may correspond to downlink data blocks in different time-domain scheduling units respectively, or the multiple ACK/NACK signals may correspond to different codewords of a same downlink data block.

In combination with the second aspect or any abovementioned possible implementation mode, in a possible implementation mode of the second aspect, the operation that the terminal determines the physical resource for transmitting the uplink control signal in the time-domain scheduling unit may include that: the terminal receives indication information transmitted by the network device, the indication information being used to indicate the physical resource for transmitting the uplink control signal in the time-domain scheduling unit.

In combination with the second aspect or any abovementioned possible implementation mode, in a possible implementation mode of the second aspect, the operation that the terminal receives the indication information transmitted by the network device, the indication information being used to indicate the physical resource for transmitting the uplink control signal in the time-domain scheduling unit, may include that: the terminal receives the indication information transmitted by the network device, the indication information being used to indicate frequency-domain resource configuration and time-domain resource configuration of the physical resource for transmitting the uplink control signal in the time-domain scheduling unit.

In combination with the second aspect or any abovementioned possible implementation mode, in a possible implementation mode of the second aspect, the indication information may further be used to indicate a physical resource used by the terminal for transmitting uplink data in the time-domain scheduling unit.

In combination with the second aspect or any abovementioned possible implementation mode, in a possible implementation mode of the second aspect, the operation that the terminal receives the indication information transmitted by the network device may include that: the terminal receives high-layer signaling or physical-layer signaling transmitted by the network device, the high-layer signaling or the physical-layer signaling carrying the indication information.

In combination with the second aspect or any abovementioned possible implementation mode, in a possible implementation mode of the second aspect, the method may further include that: the terminal determines at least one of a transmission times needed for transmission of the uplink control signal or a length of an extended sequence of the uplink control signal according to an indication of the network device; and the operation that the terminal transmits the uplink control signal to the network device on the physical resource for transmitting the uplink control signal may further include that: the terminal transmits the uplink control signal to the network device on the physical resource for transmitting the uplink control signal according to the at least one of the transmission times needed for transmission of the uplink control signal or the length of the extended sequence of the uplink control signal.

The network device indicates the transmission times needed for transmission of the uplink control signal and the length of the extended sequence of the uplink control signal to the terminal, so that the coverage rate for transmitting the uplink control signal is increased.

In combination with the second aspect or any abovementioned possible implementation mode, in a possible implementation mode of the second aspect, the operation that the terminal determines at least one of the transmission times needed for transmission of the uplink control signal or the length of the extended sequence of the uplink control signal according to the indication of the network device may include that: the terminal receives a length of a sequence of the uplink control signal from the network device; and the terminal receives a number of the physical resource for transmitting the uplink control signal from the network device, and the terminal determines the transmission times needed for transmission of the uplink control signal according to the sequence length of the uplink control signal and the number of the physical resource for transmitting the uplink control signal.

In combination with the second aspect or any abovementioned possible implementation mode, in a possible implementation mode of the second aspect, the operation that the terminal determines at least one of the transmission times needed for transmission of the uplink control signal or the length of the extended sequence of the uplink control signal according to the indication of the network device may include that: the terminal receives DCI transmitted by the network device, the DCI carrying at least one of the transmission times needed for transmission of the uplink control signal or the length of the extended sequence of the uplink control signal.

In combination with the second aspect or any abovementioned possible implementation mode, in a possible implementation mode of the second aspect, the operation that the terminal determines at least one of the transmission times needed for transmission of the uplink control signal or the length of the extended sequence of the uplink control signal according to the indication of the network device may include that: the terminal receives high-layer signaling transmitted by the network device, the high-layer signaling carrying at least one of a transmission times needed for transmission of a first-type uplink signal or a length of an extended sequence of the first-type uplink signal.

A third aspect provides a device for transmitting an uplink signal, which includes modules configured to execute the method in the first aspect.

A fourth aspect provides a device for transmitting an uplink signal, which includes modules configured to execute the method in the second aspect.

A fifth aspect provides a device for transmitting an uplink signal, which includes a memory, a processor, an input/output interface, a communication interface and a bus system. The memory, the processor, the input/output interface and the communication interface are connected through the system bus, the memory is configured to store an instruction, the processor is configured to execute the instruction stored in the memory, and when the instruction is executed, the processor executes the method in the first aspect through the communication interface, and controls the input/output interface to receive input data and information and output data such as an operation result.

A sixth aspect provides a device for transmitting an uplink signal, which includes a memory, a processor, an input/output interface, a communication interface and a bus system. The memory, the processor, the input/output interface and the communication interface are connected through the system bus, the memory is configured to store an instruction, the processor is configured to execute the instruction stored in the memory, and when the instruction is executed, the processor executes the method in the second aspect through the communication interface, and controls the input/output interface to receive input data and information and output data such as an operation result.

A seventh aspect provides a computer-readable storage medium, which stores program codes for the method for transmitting the uplink signal, the program codes being configured to execute method instructions in the first aspect.

An eighth aspect provides a computer-readable storage medium, which stores program codes for the method for transmitting the uplink signal, the program codes being configured to execute method instructions in the second aspect.

DETAILED DESCRIPTION

The technical solutions in the embodiments of the disclosure will be described below in combination with the drawings.

Figure 1:
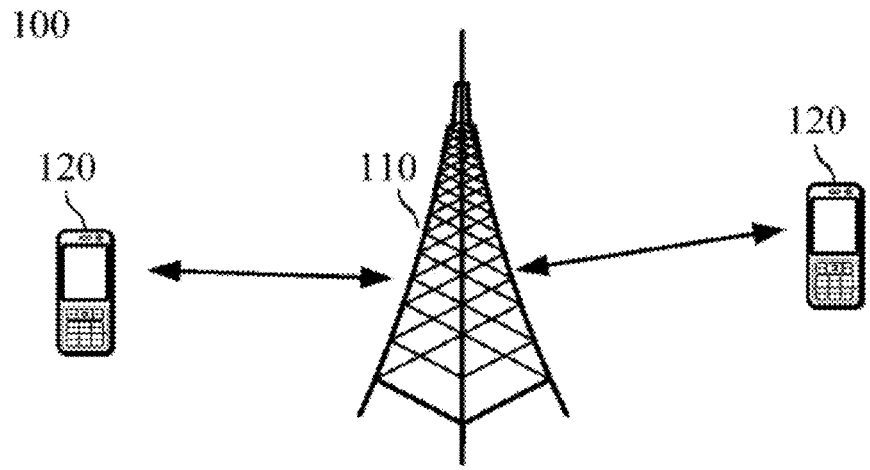
FIG. 1 illustrates a wireless communication system 100 to which the embodiments of the disclosure are applied.

FIG. 1 illustrates a wireless communication system 100, to which the embodiments of the disclosure are applied. The wireless communication system 100 may include a network device 110 and terminal devices 120. The network device 110 may be a device communicating with a terminal device 120. The network device 110 may provide communication coverage for a specific geographical region and may communicate with a terminal device 120 (for example, User Equipment (UE)) located in the coverage.

A network device and two terminals are exemplarily illustrated in FIG. 1. Alternatively, the wireless communication system 100 may include multiple network devices and another number of terminals may be included in coverage of each network device. There are no limits made thereto in the embodiments of the disclosure.

Alternatively, the wireless communication system 100 may further include other network entities such as a network controller and a mobility management entity. There are no limits made thereto in the embodiments of the application.

It is to be understood that the technical solutions of the embodiments of the disclosure may serve various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an Advanced Long Term Evolution (LTE-A) system, a Universal Mobile Telecommunication System (UMTS), New Radio Access Technology (NR) and 5th-Generation (5G).

It is also to be understood that, in the embodiments of the disclosure, a terminal device may include, but not limited to, a Mobile Station (MS), a mobile terminal, a mobile telephone, UE, a handset, portable equipment and the like. The terminal device may communicate with one or more core networks through a Radio Access Network (RAN). For example, the terminal device may be a mobile phone (or called a "cell" phone), a computer with a wireless communication function and the like. The terminal device may also be a portable, pocket, handheld, computer-embedded or vehicle-mounted mobile device.

In the embodiments of the disclosure, a network device may be an access network device and, for example, may be a base station, a Transmit and Receive Point (TRP) or an access point. The base station may be a Base Transceiver Station (BTS) in the GSM or the CDMA, may also be a NodeB in the WCDMA, may also be an Evolved Node B (eNB or e-NodeB) in the LTE and may further be a gNB in the NR or the 5G. There are no specific limits made thereto in the embodiments of the disclosure.

Multiple services exist in a future 5G communication system, for example, Enhanced Mobile Broadband (eMBB) and Ultra Reliable Low Latency (URLLC). Different services have different uplink signal transmission requirements. For example, some services require a terminal to feed back whether downlink data transmitted by a network device is successfully received or not relatively fast to reduce an overall transmission delay of the downlink data. Some services require high-capacity feedback to be supported during uplink signal transmission. For example, uplink signals of multiple types are transmitted through a Physical Resource Block (PRB).

In order to meet uplink signal transmission requirements of different services, during uplink transmission in the 5G system, a CP-OFDM waveform and a DFT-S-FDMA waveform may be adopted. That is, during uplink transmission in the 5G system, both of a single-carrier transmission manner and a multi-carrier manner may be supported to meet transmission requirements of different services in the 5G system on uplink transmission.

A method for transmitting an uplink signal will be introduced below in combination with FIG. 2 in detail.

Figure 2:
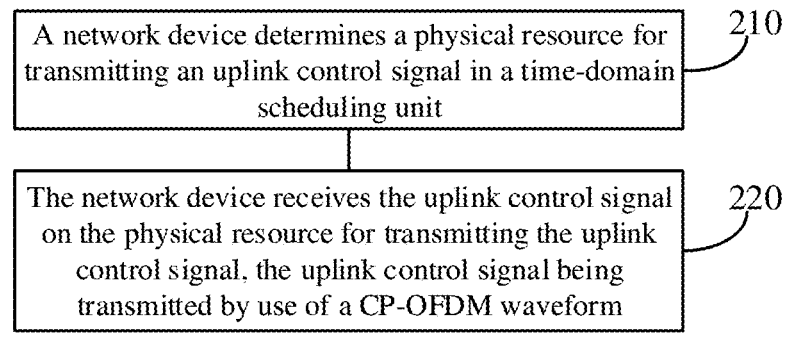
FIG. 2 illustrates a schematic flowchart of a method for transmitting an uplink signal according to an embodiment of the disclosure.

FIG. 2 illustrates a schematic flowchart of a method for transmitting an uplink signal according to an embodiment of the disclosure. The method illustrated in FIG. 2 includes the following actions.

In 210, a network device determines a physical resource for transmitting an uplink control signal in a time-domain scheduling unit.

Specifically, the time-domain scheduling unit may be an uplink scheduling period and may be a slot. The time-domain scheduling unit may include 7 OFDM symbols under the condition of a normal Cyclic Prefix (CP). The time-domain scheduling unit may include 6 OFDM symbols under the condition of an extended CP.

The uplink control signal may include uplink signals of different types, for example, an ACK/NACK signal and a CSI feedback signal.

The physical resource may be a Resource Element (RE).

Transmission of the uplink control signal with a CP-OFDM waveform may mean that the uplink control signal is modulated through the CP-OFDM waveform and mapped onto the corresponding physical resource.

Alternatively, as an embodiment, the physical resource for transmitting the uplink control signal in the time-domain scheduling unit includes at least one physical resource region, and different physical resource regions are used to transmit uplink control signals of different types.

Specifically, the uplink control signal may include uplink control signals of multiple different types.

It is to be understood that the physical resource region may include multiple RBs and the RBs may be continuous in frequency domain. The physical resource region may also be a physical resource region on an RB, that is, an RB may include at least one physical resource region.

Alternatively, each of the at least one physical resource region consists of at least one frequency-domain RB in the frequency domain.

Alternatively, the uplink control signal includes uplink control signals of different types, the physical resource for transmitting the uplink control signal may be an RB, the RB includes the at least one physical resource region, and different physical resource regions are used to transmit the uplink control signals of different types.

Specifically, the RB may be used as a minimum scheduling unit for uplink signal transmission.

Each physical resource region in multiple physical resource regions may include multiple REs continuous in the frequency domain and multiple OFDM symbols.

Alternatively, as an embodiment, the at least one physical resource region includes a first physical resource region, and a first OFDM symbol of the first physical resource region in time domain is a starting OFDM symbol in the time-domain scheduling unit.

For example, the first OFDM symbol of the first physical resource region in the time domain may be a first OFDM symbol, i.e., a starting OFDM symbol, of a PRB.

Alternatively, the at least one physical resource region further includes a second physical resource region, and the second physical resource region and the first physical resource region are continuous in the time domain.

Alternatively, the first physical resource region may be used to transmit the ACK/NACK signal, and the second physical resource region is used to transmit the CSI feedback signal.

Alternatively, the first physical resource region is further used to transmit reference signals. That is, both of the ACK/NACK signal and the reference signals may be transmitted in the first physical resource region. The reference signals are configured to demodulate the ACK/NACK signal.

It is to be understood that an ACK/NACK feedback mode corresponding to the ACK/NACK signal may include an ACK/NACK merging mode and an ACK/NACK multiplexing mode. There are no specific limits made thereto in the disclosure.

It is to be noted that, when an uplink control signal is transmitted in the first physical resource region, the second physical resource region may be used to transmit uplink data; and when an uplink control signal is transmitted in the first physical resource region, an uplink control signal may also be transmitted in the second physical resource region. The uplink control signal transmitted in the first physical resource region and the uplink control signal transmitted in the second physical resource region may belong to different types.

Figure 3:
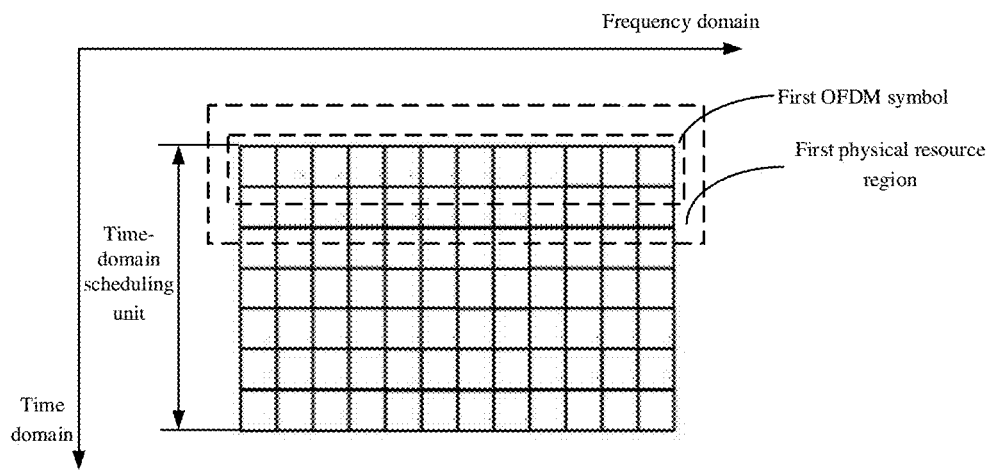
FIG. 3 illustrates a schematic diagram of physical resource configuration for transmitting an uplink signal according to an embodiment of the disclosure.

Specifically, FIG. 3 illustrates a schematic diagram of physical resource configuration for transmitting an uplink signal according to an embodiment of the disclosure. It is to be understood that descriptions are made in combination with FIG. 3 only with the condition that the first physical resource region includes physical resources of two OFDM symbols as an example, and there are no specific limits made to the number of OFDM symbols in the first physical resource region in the embodiment of the disclosure. From FIG. 3, it can be seen that the physical resource in the time-domain scheduling unit (for example, a PRB) includes the first physical resource region and the first OFDM symbol (i.e., a first OFDM symbol in the time domain) in the first physical resource region may be the starting OFDM symbol (i.e., a first OFDM symbol in the time domain) in the time-domain scheduling unit.

Alternatively, as an embodiment, the at least one physical resource region includes a third physical resource region, and a last OFDM symbol of the third physical resource region in the time domain is a last OFDM symbol in the time-domain scheduling unit.

Figure 4:
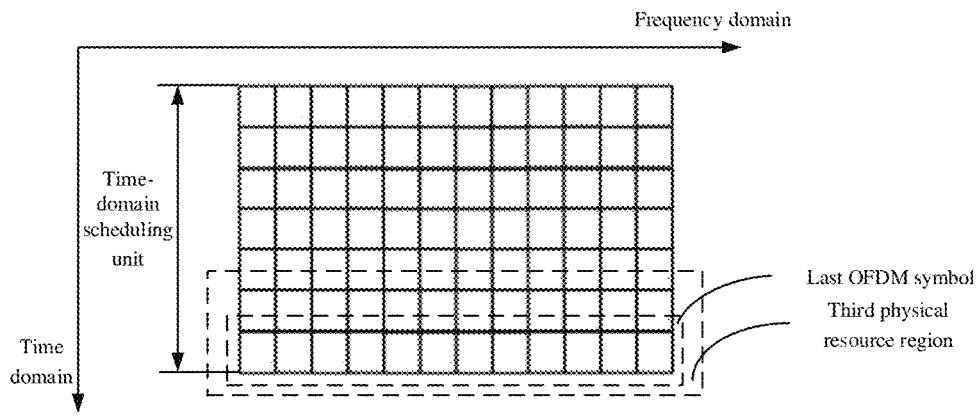
FIG. 4 illustrates a schematic diagram of physical resource configuration for transmitting an uplink signal according to another embodiment of the disclosure.

It is to be understood that FIG. 4 illustrates a schematic diagram of physical resource configuration for transmitting an uplink signal according to another embodiment of the disclosure. Descriptions are made in combination with FIG. 4 by taking that the third physical resource region includes a physical resource of one OFDM symbol as an example, and there are no specific limits made to the number of OFDM symbols in the third physical resource region in the embodiment of the disclosure. A physical resource corresponding to an OFDM symbol before a first OFDM symbol (i.e., a starting OFDM symbol) in the third physical resource region may be configured for downlink transmission between the network device and a base station. That is, downlink transmission and uplink transmission is switched before the first OFDM symbol corresponding to the third physical resource region, and uplink transmission between the network device and the terminal may be started from the first OFDM symbol corresponding to the third physical resource region. Physical resource configuration manner may be called a short format for uplink control signal.

It is also to be understood that a time-frequency resource before the first OFDM symbol in the third transmission region may include a time-frequency resource for uplink transmission. That is, at least one of a first physical resource or a second physical resource may exist on the time-frequency resource before the first OFDM symbol of the third transmission region. However, in a time-frequency resource configuration method, a mode for the uplink control signal transmitted in the third physical resource region is not the short format for uplink control signal any more.

It is also to be understood that the second physical resource region and the third physical resource region may be continuous in the time domain. That is, a next OFDM symbol of a last OFDM symbol in the second physical resource region may be used as the first OFDM symbol in the third physical resource region. An overlapped physical resource region may also exist between the second physical resource region and the third physical resource region. There are no specific limits made thereto in the embodiment of the disclosure.

It is to be noted that an overlapped physical resource region may exist among the first physical resource region, the second physical resource region and the third physical resource region, and the first physical resource region, the second physical resource region and the third physical resource region may also be continuous in the time domain. There are no limits made to a specific division manner for the physical resource regions in the embodiment of the disclosure.

Alternatively, the uplink control signal includes multiple ACK/NACK signals, in the third physical resource region, physical resources for transmitting the multiple ACK/NACK signals and physical resource for transmitting reference signals are not overlapped, and physical resources in a resource group for transmitting the multiple ACK/NACK signals and the physical resources for transmitting the reference signals are staggered and continuously arranged in a same OFDM symbol.

Specifically, the resource group includes multiple physical resources which are continuous in the frequency domain, for example, multiple REs which are continuous in the frequency domain, in an OFDM symbol.

Alternatively, that the physical resources in the resource group for transmitting the multiple ACK/NACK signals and the physical resources for transmitting the reference signals are staggered and continuously arranged in a same OFDM symbol may mean that the resource group where the physical resources for transmitting the multiple ACK/NACK signals are located and the physical resources for transmitting the reference signals are staggered and continuously arranged in a same OFDM symbol.

Alternatively, in the third physical resource transmission region, the multiple ACK/NACK signals are repeatedly mapped, for a transmission times of the multiple ACK/NACK signals, onto resource groups at different positions after being extended and superposed by use of different orthogonal sequences or pseudo-orthogonal sequences with a same length respectively, and the resource groups include the physical resources for transmitting the multiple ACK/NACK signals.

Specifically, the resource groups at different positions may mean that the positions corresponding to multiple resource groups correspond to different positions in the time-domain scheduling unit.

Alternatively, the resource groups at the different positions may be continuous in at least one of the time domain or the frequency domain.

Figure 5:
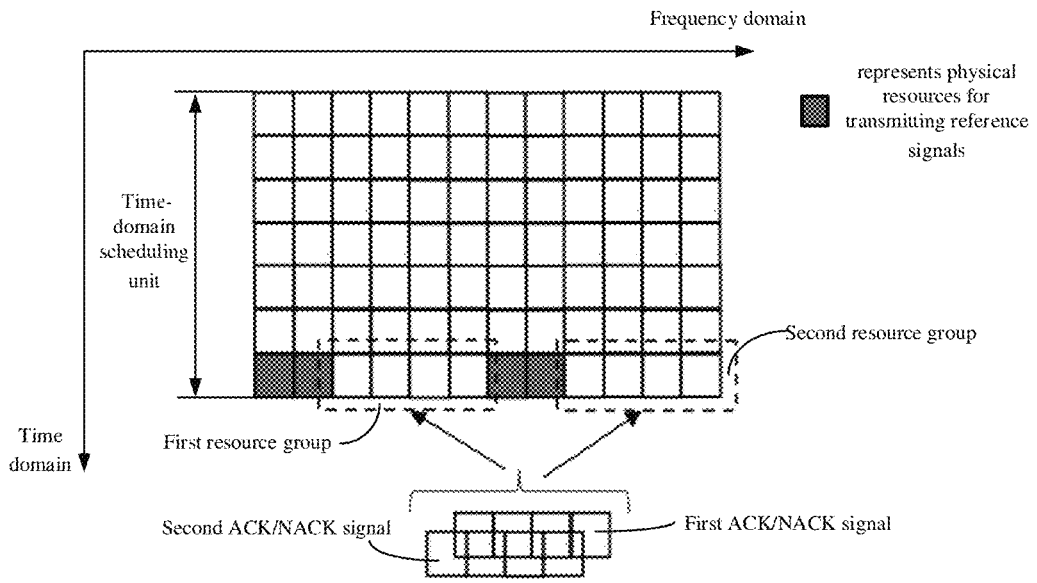
FIG. 5 illustrates a schematic diagram of physical resource configuration for transmitting an uplink signal according to another embodiment of the disclosure.

For example, FIG. 5 illustrates a schematic diagram of physical resource configuration for transmitting an uplink signal according to another embodiment of the disclosure. From FIG. 5, it can be seen that a position of the physical resources for transmitting the reference signals and a position of the resource group (a first resource group and second resource group in FIG. 5) used to transmit the ACK/NACK signals are staggered and arranged in the last OFDM symbol. Continuous physical resources in the first resource group are occupied by a first ACK/NACK signal and a second ACK/NACK signal and, meanwhile, continuous physical resources in the second resource group are occupied by the first ACK/NACK signal and the second ACK/NACK signal. That is, the first ACK/NACK signal and the second ACK/NACK signal are transmitted twice on the physical resources in the time-domain scheduling unit. The first ACK/NACK signal and the second ACK/NACK signal may be extended and superposed by use of different orthogonal sequences or pseudo-orthogonal sequences with a same length.

Alternatively, as an embodiment, an overlapped physical resource region exists between the second physical resource region and the third physical resource region.

Specifically, a physical resource in the overlapped physical resource region may be configured for the uplink signal transmitted in the second physical resource region, or may be configured for the uplink signal transmitted in the third physical resource region.

It is to be understood that the overlapped physical resource region may mean that part of physical resource region in the second physical resource region and part of physical resource region in the third physical resource region are overlapped, or the overlapped physical resource region may mean that the second physical resource region includes the third physical resource region. There are no limits made to a specific overlapping form of the second physical resource region and the third physical resource region in the embodiment of the disclosure.

Alternatively, the uplink signal includes the uplink control signal, the reference signal and the like.

Alternatively, as an embodiment, the uplink control signal includes a first-type uplink control signal and a second-type uplink control signal. The method further includes that: in the overlapped physical resource region, the network device configures a physical resource used by the terminal for transmitting the first-type uplink signal; and in the overlapped physical resource region, the network device configures a physical resource used by the terminal for transmitting the second-type uplink signal, a priority of the physical resource configured by the network device for the first-type uplink signal being higher than a priority of the physical resource configured by the network device for the second-type uplink signal.

Specifically, the overlapped physical resource region exists between the second physical resource region and the third physical resource region, the second physical resource region is used to transmit the second-type uplink control signal and the third physical resource region is used to transmit the first-type uplink control signal. The network device may configure a physical resource for transmitting the first-type uplink control signal for the terminal in the overlapped physical resource region at first, and then configure a physical resource for transmitting the second-type uplink control signal for the terminal in physical resources except the physical resource for transmitting the first-type uplink control signal.

Alternatively, the first-type uplink control signal may include the ACK/NACK signal, and the second-type uplink control signal includes the CSI feedback signal.

Figure 6:
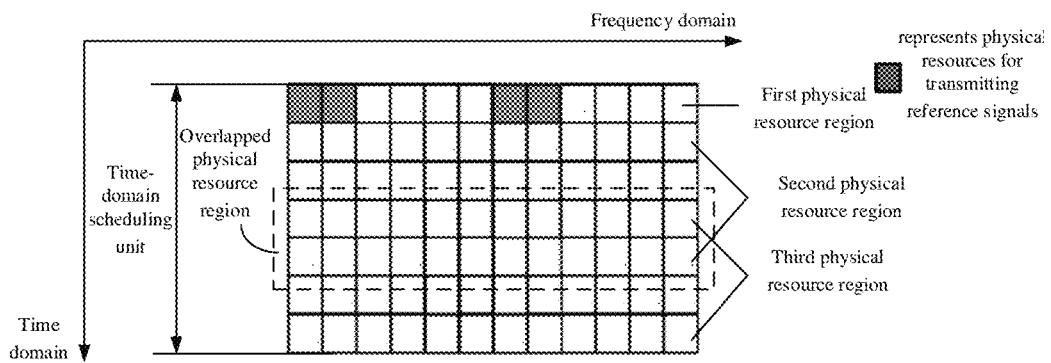
FIG. 6 illustrates a schematic diagram of physical resource configuration for transmitting an uplink signal according to another embodiment of the disclosure.

For example, FIG. 6 illustrates a schematic diagram of physical resource configuration for transmitting an uplink signal according to another embodiment of the disclosure.

From the schematic diagram of the uplink transmission resource configuration in FIG. 6, it can be seen that the first physical resource region includes a physical resource corresponding to a first OFDM symbol, the second physical resource region includes physical resources corresponding to a second OFDM symbol to a fifth OFDM symbol, and the third physical resource region includes physical resources corresponding to a fourth OFDM symbol to a seventh OFDM symbol. That is, the overlapped physical resource region between the second physical resource region and the third physical resource region includes the physical resource corresponding to the fourth OFDM symbol and the physical resource corresponding to the fifth OFDM symbol. The first physical resource region is used to transmit the ACK/NACK signal, the second physical resource region is used to transmit the CSI feedback signal, and the third physical resource region is used to transmit the ACK/NACK signal.

It is to be noted that any physical resource region in the first physical resource region, the second physical resource region and the third physical resource region may further be used to transmit the reference signal. Descriptions are made in combination with the schematic diagram of the resource configuration in FIG. 5 by taking that the reference signals are transmitted in the first physical resource region as an example.

Alternatively, as an embodiment, the overlapped physical resource region existing between the first physical resource region or the second physical resource region and the third physical resource region means that the network device configures at least one of the physical resources for transmitting the ACK/NACK signal and/or the reference signal in the third physical resource region for at least one of the uplink control signal and/or reference signal transmitted in the first physical resource region or the second physical resource region. In such a case, the at least one of the uplink control signal or reference signal transmitted by occupying the physical resource in the third physical resource region may be punctured by the at least one of an uplink control signal or reference signal originally required to be transmitted in the third physical resource. Therefore, the problem of resource conflict between the uplink control signal and reference signal in different physical resource regions is solved.

In 220, the network device receives the uplink control signal on the physical resource for transmitting the uplink control signal, the uplink control signal being transmitted by use of a CP-OFDM waveform.

Alternatively, as an embodiment, the method further includes that: the network device determines a physical resource used by a terminal for transmitting a reference signal in the time-domain scheduling unit, the physical resource for transmitting the reference signals being configured in one of the at least one physical resource region.

Alternatively, the third physical resource region is further used to transmit the reference signals, and the second physical resource region is further used to transmit the reference signals.

Specifically, the reference signals may be used to demodulate the ACK/NACK signal.

Alternatively, the reference signals in the second physical resource region are not transmitted in the overlapped physical resource region.

It is to be noted that the positions of the physical resources corresponding to the physical resources for transmitting the reference signals may be fixed. That is, the physical resources for transmitting the reference signals in the second physical resource may be fixed and the physical resources for transmitting the reference signals in the third physical resource may also be fixed. Since the priority of the physical resource configured for the uplink signal transmitted in the second transmission physical resource region in the overlapped physical resource region is lower than the priority of the physical resource configured for the uplink signal transmitted in the third transmission physical resource region, for avoiding the condition that the physical resource originally used to transmit the reference signal is used to transmit the uplink control signal in the third physical resource region, and thus the network device may not demodulate the ACK/NACK signal in the first transmission region according to the reference signal (in such a case, the physical resources for transmitting the reference signals may not be configured in the first physical resource region), the physical resources for transmitting the reference signals may not be configured in the overlapped physical resource region when the physical resources are configured for the reference signals transmitted in the second physical resource region.

For example, in the schematic diagram of the uplink transmission resource configuration in FIG. 6, the reference signals are not transmitted in the overlapped physical resource region between the second physical resource region and the third physical resource region, i.e., on the physical resource corresponding to the fourth OFDM symbol and the physical resource corresponding to the fifth OFDM symbol.

Alternatively, the physical resources for transmitting the reference signals are distributed in the frequency domain or the time domain, or the physical resources for transmitting the reference signals are continuous in the frequency domain and/or the time domain.

Specifically, in the arrangement of the physical resources for transmitting the reference signals in the first physical resource region illustrated in FIG. 6, in an OFDM symbol, resource groups where the physical resources for transmitting the reference signals are located are distributed in the frequency domain.

Figure 7:
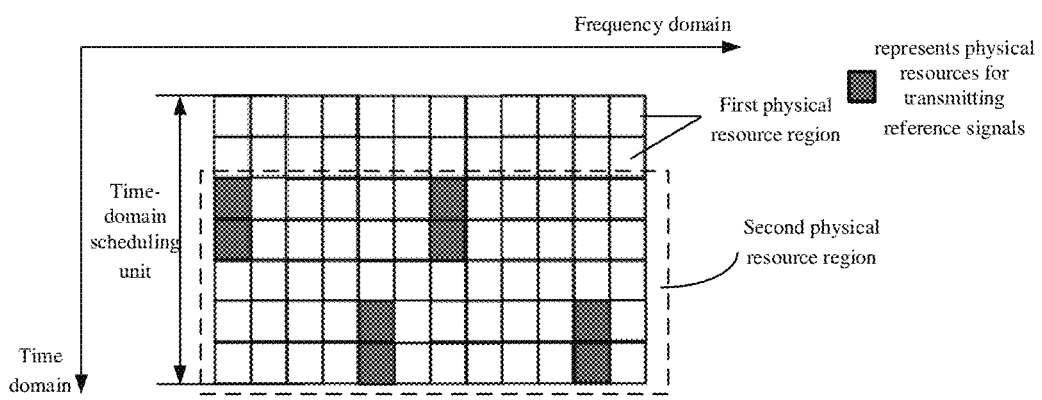
FIG. 7 illustrates a schematic diagram of physical resource configuration for transmitting an uplink signal according to another embodiment of the disclosure.

In the arrangement of the physical resources for transmitting the reference signals in the second physical resource region illustrated in FIG. 7, the resource group where the physical resources for transmitting the reference signals are located includes multiple resource groups, and the resource groups where the physical resources for transmitting the reference signals are located are distributed in the frequency domain (which may mean that multiple resource groups correspond to different frequencies). Each resource group used to transmit the reference signals occupies two continuous OFDM symbols.

Figure 8:
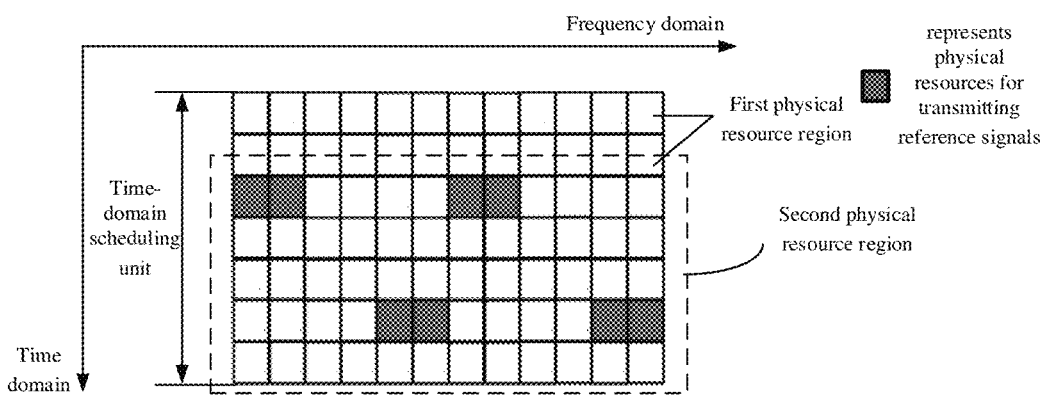
FIG. 8 illustrates a schematic diagram of physical resource configuration for transmitting an uplink signal according to another embodiment of the disclosure.

In an arrangement of the physical resources for transmitting the reference signals in the second physical resource region illustrated in FIG. 8, the resource group where the physical resource for transmitting the reference signals are located includes multiple resource groups, each resource group in the multiple resource groups occupies two different OFDM symbols and, in one OFDM symbol, the resource group where the physical resource for transmitting the reference signals is located is distributed in the frequency domain.

It is to be noted that descriptions are made in the embodiment of the disclosure by taking that the resource group used to transmit the reference signal includes two physical resources as an example. The resource group used to transmit the reference signal may also include four physical resources. There are no specific limits made to the number of physical resources in the resource group for transmitting the reference signal in the embodiment of the disclosure.

Alternatively, as an embodiment, the uplink control signal includes the multiple ACK/NACK signals, in the first physical resource region, physical resources for transmitting the multiple ACK/NACK signals and physical resources for transmitting a reference signal are not overlapped, and physical resources in a resource group for transmitting the multiple ACK/NACK signals and the physical resources for transmitting the reference signals are staggered and continuously arranged in a same OFDM symbol.

Specifically, the resource group may include a group of physical resources which are continuous in the frequency domain. That is, multiple resource groups may be included in an OFDM symbol.

Alternatively, that the physical resources in the resource group for transmitting the multiple ACK/NACK signals and the physical resources for transmitting the reference signals are staggered and continuously arranged in a same OFDM symbol, which may mean that the resource group where the physical resources for transmitting the multiple ACK/NACK signals are located and the physical resources for transmitting the reference signals are staggered and continuously arranged in a same OFDM symbol.

The resource group where at least part of physical resources transmitting the multiple ACK/NACK signals are located may mean that all of the physical resources for transmitting the multiple ACK/NACK signals are located in a resource group. The resource group where at least part of the physical resources for transmitting the multiple ACK/NACK signals is located may also mean that part of the physical resources for transmitting the multiple ACK/NACK signals are in a resource group and the other part of the physical resources for transmitting the multiple ACK/NACK signals are in other resource group(s).

Alternatively, when the physical resources for transmitting the multiple

ACK/NACK signal are in multiple resource groups, the multiple resource groups are continuous or distributed in the frequency domain.

Figure 9:
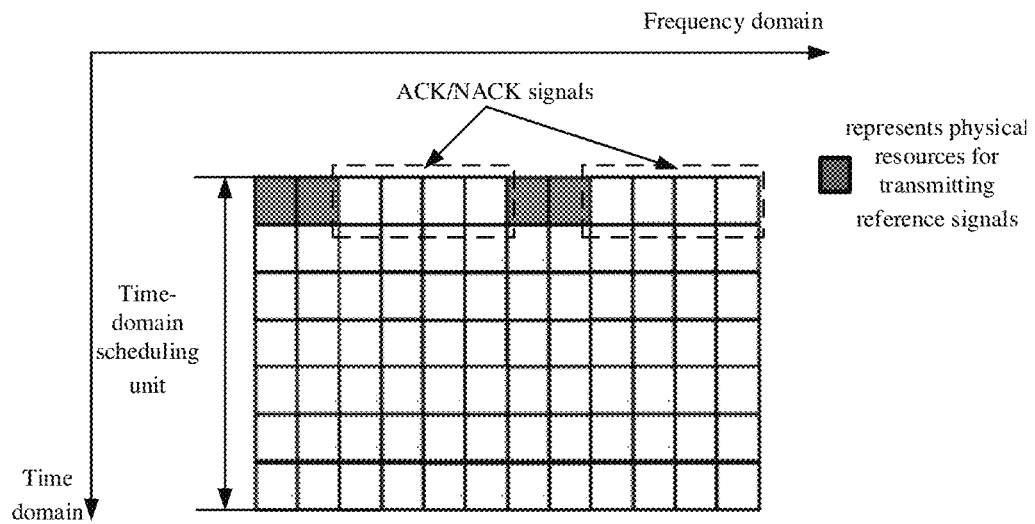
FIG. 9 illustrates a schematic diagram of physical resource configuration for transmitting an uplink signal according to another embodiment of the disclosure.

For example, FIG. 9 illustrates a schematic diagram of physical resource configuration for transmitting an uplink signal according to another embodiment of the disclosure. In a resource configuration manner illustrated in FIG. 9, after the ACK/NACK signals are extended, eight physical resources (for example, REs) are required to be occupied to transmit the ACK/NACK signals. However, since there are only four physical resources in a resource group between two physical resources used to transmit the reference signals, two resource groups, totally eight physical resources, may be configured for the extended ACK/NACK signals, the two resource groups are discontinuous in the frequency domain but the physical resources in each resource group are continuous in the frequency domain.

It is to be understood that the extended ACK/NACK signals are transmitted by the physical resources in the resource groups.

Alternatively, physical resources in the resource group where the physical resources for the multiple ACK/NACK signals are located are continuous in the frequency domain.

Alternatively, as an embodiment, the multiple ACK/NACK signals are superposed and mapped onto the resource group after being extended by use of different orthogonal sequences or pseudo-orthogonal sequences with a same length respectively.

For example, after ACK/NACK signals of a first group are extended through a first orthogonal sequence and ACK/NACK signals of a second group are extended through a second orthogonal sequence, the ACK/NACK signals of the first group and the ACK/NACK signals of the second group may have a same length. For example, four REs may be occupied by the ACK/NACK signals of the first group and the ACK/NACK signals of the second group, the ACK/NACK signals of the first group and the ACK/NACK signals of the second group may be mapped onto the same resource group, and the resource group may include four REs.

Alternatively, as an embodiment, the uplink control signal further includes the CSI feedback signal, the physical resource for transmitting the CSI feedback signal and physical resources for transmitting the reference signals in the second physical resource transmission region are not overlapped, and the physical resources in the resource group for transmitting the reference signals are continuous in the time domain.

For example, the resource group for transmitting the reference signals includes two REs, i.e., a first RE and a second RE. The first RE may be an occupied RE in the first OFDM symbol and the second RE may be an occupied RE in the second OFDM symbol. The first OFDM symbol and the second OFDM symbol are continuous in the time domain, and the first RE and the second RE correspond to a same subcarrier.

Alternatively, as an embodiment, in the first physical resource transmission region, the multiple ACK/NACK signals are repeatedly mapped, for a transmission times of the multiple ACK/NACK signals, onto resource groups at different positions after being extended and superposed by use of different orthogonal or pseudo-orthogonal sequences with a same length respectively.

Specifically, the resource group includes the physical resources for transmitting the multiple ACK/NACK signals.

For example, after the ACK/NACK signals of the first group are extended through the first orthogonal sequence and the ACK/NACK signals of the second group are extended through the second orthogonal sequence, the ACK/NACK signals of the first group and the ACK/NACK signals of the second group may have a same length. For example, four REs may be occupied by the ACK/NACK signals of the first group and the ACK/NACK signals of the second group, the ACK/NACK signals of the first group and the ACK/NACK signals of the second group may be mapped onto different resource groups respectively, and each resource group may include four REs.

Alternatively, as an embodiment, the multiple ACK/NACK signals correspond to downlink data blocks in different time-domain scheduling units respectively, or the multiple ACK/NACK signals correspond to different codewords of a same downlink data block.

Figure 10:
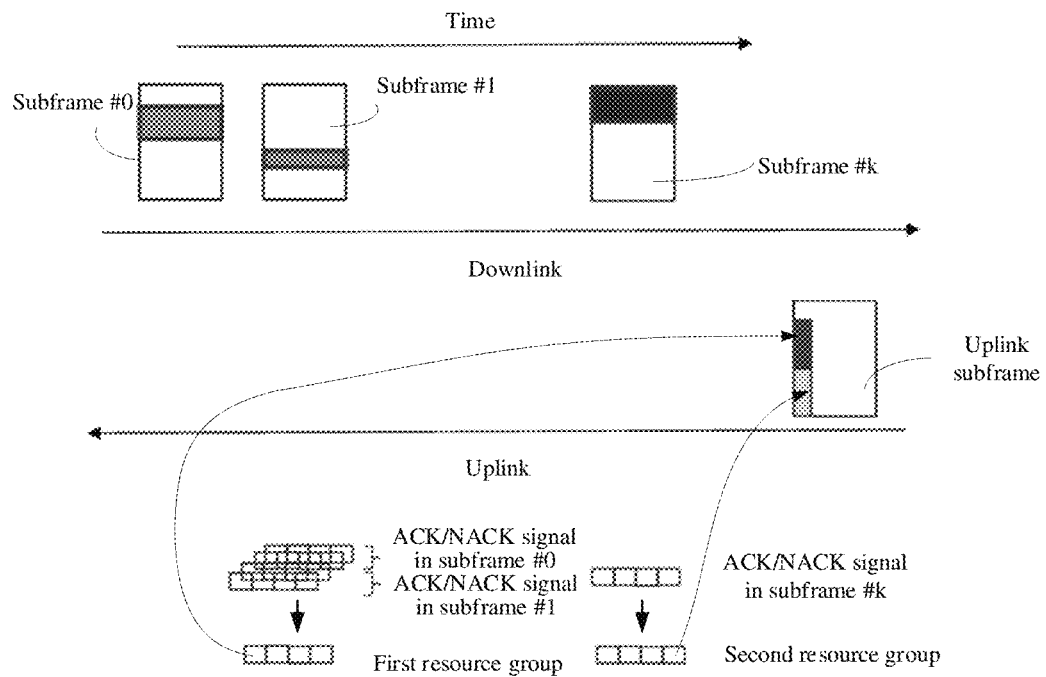
FIG. 10 illustrates a schematic diagram of a method for transmitting an uplink signal according to another embodiment of the disclosure.

The uplink signal transmission method will be described in combination with FIG. 10 with a subframe as an example. FIG. 9 illustrates a schematic diagram of a method for transmitting an uplink signal according to another embodiment of the disclosure. From the uplink transmission method illustrated in FIG. 10, it can be seen that an uplink subframe contains ACK/NACK signals of a subframe #0, subframe #1 and subframe #k for downlink transmission. The ACK/NACK signals of the subframe #0 and the subframe #1 are mapped onto physical resources in a first resource group of the uplink subframe. After the physical resources in the first resource group are occupied by the ACK/NACK signals, the ACK/NACK signals of the subframe #k may be mapped onto a physical resource in a second resource group corresponding to a subframe for uplink transmission.

Alternatively, as an embodiment, before the operation that the network device receives the uplink control signal on the physical resource for transmitting the uplink control signal, the method further includes that: the network device transmits indication information to the terminal, the indication information being used to indicate the physical resource for transmitting the uplink control signal in the time-domain scheduling unit.

Alternatively, as an embodiment, the method further includes that: the network device determines a transmission times needed for transmission of the uplink control signal and/or a length of an extended sequence of the uplink control signal; and the network device indicates the transmission times needed for transmission of the uplink control signal and/or the length of the extended sequence of the uplink control signal to the terminal.

Specifically, the transmission times may be a repeat count needed for uplink control signal transmission by the terminal.

Alternatively, the operation that the network device indicates the transmission times needed for transmission of the uplink control signal and/or the length of the extended sequence of the uplink control signal to the terminal includes that: the network device transmits DCI to the terminal, the DCI carrying the transmission times needed for transmission of the uplink control signal and/or the length of the extended sequence of the uplink control signal.

Alternatively, the operation that the network device indicates the transmission times needed for transmission of the uplink control signal and/or the length of the extended sequence of the uplink control signal to the terminal includes that: the network device transmits a length of a sequence of the uplink control signal to the terminal; and the network device transmits a number of the physical resource for transmitting the uplink control signal to the terminal.

Specifically, the network device indicates the sequence length for transmitting of the uplink control signal and the number of the physical resource for transmitting the uplink control signal by the terminal to the terminal, which may enable the terminal to determine the transmission times (which may be a repeat count) for transmitting the uplink control signal according to the sequence length for transmitting the uplink control signal and the number of the physical resource for transmitting the uplink control signal by the terminal.

For example, if the terminal determines that the sequence length for transmitting the uplink control signal is 4 and the network device configures 8 REs for the terminal to transmit the uplink control signal, the terminal may determine that the transmission times for transmitting the uplink control signal is 2.

Alternatively, the operation that the network device indicates the at least one of the transmission times needed for transmission of the uplink control signal or the length of the extended sequence of the uplink control signal to the terminal includes that: the network device transmits high-layer signaling to the terminal, the high-layer signaling carrying at least one of a transmission times needed for transmission of a first-type uplink signal or a length of an extended sequence of the first-type uplink signal.

Figure 11:
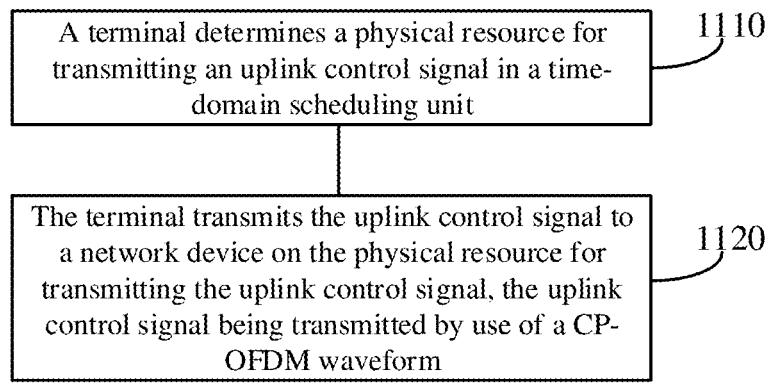
FIG. 11 illustrates a schematic flowchart of a method for transmitting an uplink signal according to another embodiment of the disclosure.

FIG. 11 illustrates a schematic flowchart of a method for transmitting an uplink signal according to another embodiment of the disclosure. The method illustrated in FIG. 11 corresponds to the method illustrated in FIG. 2. For simplicity, specific details will not be elaborated herein. The method illustrated in FIG. 11 includes the following actions.

In 1110, a terminal determines a physical resource for transmitting an uplink control signal in a time-domain scheduling unit.

Specifically, the operation that the terminal determines the physical resource for transmitting the uplink control signal in the time-domain scheduling unit may include that the terminal determines the physical resource according to indication information transmitted to the terminal by a network device and used to indicate the physical resource for transmitting the uplink control signal, or may indicate that the terminal determines the physical resource for transmitting the uplink control signal according to a predetermined physical resource mapping rule for the uplink control signal.

In 1120, the terminal transmits the uplink control signal to a network device on the physical resource for transmitting the uplink control signal, the uplink control signal being transmitted by use of a CP-OFDM waveform.

Alternatively, as an embodiment, the physical resource for transmitting the uplink control signal in the time-domain scheduling unit includes at least one physical resource region, and different physical resource regions are used to transmit uplink control signals of different types.

Alternatively, as an embodiment, each of the at least one physical resource region consists of at least one frequency-domain RB in frequency domain.

Alternatively, as an embodiment, the uplink control signal includes uplink control signals of different types, the physical resource for transmitting the uplink control signal is an RB, the RB includes the at least one physical resource region, and different physical resource regions are used to transmit the uplink control signals of different types.

Alternatively, as an embodiment, the at least one physical resource region includes a first physical resource region, and a first OFDM symbol of the first physical resource region in time domain is a starting OFDM symbol in the time-domain scheduling unit.

Alternatively, as an embodiment, the at least one physical resource region further includes a second physical resource region, and the second physical resource region and the first physical resource region are continuous in the time domain.

Alternatively, as an embodiment, the at least one physical resource region includes a third physical resource region, and a last OFDM symbol of the third physical resource region in the time domain is a last OFDM symbol in the time-domain scheduling unit.

Alternatively, as an embodiment, physical resources for transmitting reference signals are configured in one of the at least one physical resource region.

Alternatively, as an embodiment, the physical resources for transmitting the reference signals are distributed in the frequency domain or a time domain, or the physical resources for transmitting the reference signals are continuous in the frequency domain or the time domain.

Alternatively, as an embodiment, the uplink control signal includes multiple ACK/NACK signals, in the first physical resource region, physical resources for transmitting the multiple ACK/NACK signals and the physical resources for transmitting the reference signals are not overlapped, and a physical resource in a resource group for transmitting the multiple ACK/NACK signals and the physical resources for transmitting the reference signals are staggered and continuously arranged in a same OFDM symbol.

Alternatively, as an embodiment, before the operation that the terminal transmits the uplink control signal to the network device on the physical resource for transmitting the uplink control signal, the method further includes that: the terminal extends the multiple ACK/NACK signals by use of different orthogonal or pseudo-orthogonal sequences with a same length and maps and superposes the extended sequences into the resource group.

Alternatively, as an embodiment, the uplink control signal further includes a CSI feedback signal, in the second physical resource transmission region, a physical resource for transmitting the CSI feedback signal and physical resources for transmitting the reference signals are not overlapped, and the physical resources in the resource group for transmitting the reference signals are continuous in the time domain.

Alternatively, as an embodiment, before the operation that the terminal transmits the uplink control signal to the network device by use of the physical resource for transmitting the uplink control signal, the method further includes that: the terminal extends the multiple ACK/NACK signals by use of different orthogonal or pseudo-orthogonal sequences with a same length and repeatedly maps the extended sequences onto resource groups at different positions for a transmission times of the multiple ACK/NACK signals, the resource groups including the physical resources for transmitting the multiple ACK/NACK signals.

Alternatively, as an embodiment, the uplink control signal includes the multiple ACK/NACK signals, the physical resources for transmitting the multiple ACK/NACK signals and the physical resources for transmitting the reference signals in the third physical resource region are not overlapped, and the physical resources in the resource group for transmitting the multiple ACK/NACK signals and the physical resources for transmitting the reference signals are staggered and continuously arranged in a same OFDM symbol.

Alternatively, as an embodiment, in the third physical resource transmission region, the multiple ACK/NACK signals are repeatedly mapped, for the transmission times of the multiple ACK/NACK signals, onto resource groups at different positions after being extended and superposed by use of different orthogonal or pseudo-orthogonal sequences with a same length respectively, and the resource groups include the physical resources for transmitting the multiple ACK/NACK signals.

Alternatively, as an embodiment, the multiple ACK/NACK signals correspond to downlink data blocks in different time-domain scheduling units respectively, or the multiple ACK/NACK signals correspond to different codewords of a same downlink data block.

Alternatively, as an embodiment, the operation that the terminal determines the physical resource for transmitting the uplink control signal in the time-domain scheduling unit includes that: the terminal receives indication information transmitted by the network device, the indication information being used to indicate the physical resource for transmitting the uplink control signal in the time-domain scheduling unit.

Alternatively, as an embodiment, the indication information is further used to indicate a physical resource used by the terminal for transmitting uplink data in the time-domain scheduling unit.

Alternatively, as an embodiment, the operation that the terminal receives the indication information transmitted by the network device includes that: the terminal receives high-layer signaling or physical-layer signaling transmitted by the network device, the high-layer signaling or the physical-layer signaling carrying the indication information.

Alternatively, as an embodiment, the method further includes that: the terminal determines a transmission times needed for transmission of the uplink control signal and/or a length of an extended sequence of the uplink control signal according to an indication of the network device; and the operation that the terminal transmits the uplink control signal to the network device on the physical resource for transmitting the uplink control signal further includes that: the terminal transmits the uplink control signal to the network device on the physical resource for transmitting the uplink control signal according to the transmission times needed for transmission of the uplink control signal and/or the length of the extended sequence of the uplink control signal.

Alternatively, as an embodiment, the operation that the terminal determines the transmission times needed for transmission of the uplink control signal and/or the length of the extended sequence of the uplink control signal according to the indication of the network device includes that: the terminal receives a length of a sequence of the uplink control signal from the network device; and the terminal receives a number of the physical resource for transmitting the uplink control signal from the network device, and the terminal determines the transmission times needed for transmission of the uplink control signal according to the sequence length of the uplink control signal and the number of the physical resource for transmitting the uplink control signal.

Alternatively, as an embodiment, the operation that the terminal determines the transmission times needed for transmission of the uplink control signal and/or the length of the extended sequence of the uplink control signal according to the indication of the network device includes that: the terminal receives DCI transmitted by the network device, the DCI carrying the transmission times needed for transmission of the uplink control signal and/or the length of the extended sequence of the uplink control signal.

Alternatively, as an embodiment, the operation that the terminal determines at least one of the transmission times needed for transmission of the uplink control signal or the length of the extended sequence of the uplink control signal according to the indication of the network device includes that: the terminal receives high-layer signaling transmitted by the network device, the high-layer signaling carrying at least one of a transmission times needed for transmission of a first-type uplink signal or a length of an extended sequence of the first-type uplink signal.

The uplink signal transmission methods of the embodiments of the disclosure are described above in combination with FIG. 1 to FIG. 11 in detail. Uplink signal transmission devices of the embodiments of the disclosure will be described below in combination with FIG. 12 to FIG. 15 in detail. It is to be understood that the device illustrated in FIG. 12 and FIG. 14 may implement each step in FIG. 2 and the device illustrated in FIG. 13 and FIG. 15 may implement each step in FIG. 11. For avoiding repetitions, no more elaborations will be made herein.

Figure 12:
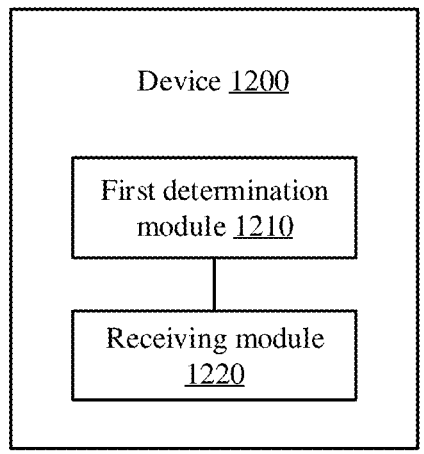
FIG. 12 illustrates a schematic block diagram of a device for transmitting an uplink control signal according to an embodiment of the disclosure.

FIG. 12 illustrates a schematic block diagram of a device for transmitting an uplink control signal according to an embodiment of the disclosure. The device 1200 illustrated in FIG. 12 includes a first determination module 1210 and a receiving module 1220.

The first determination module 1210 is configured to determine a physical resource for transmitting an uplink control signal in a time-domain scheduling unit.

The receiving module 1220 receives the uplink control signal on the physical resource for transmitting the uplink control signal, the uplink control signal being transmitted by use of a CP-OFDM waveform.

Alternatively, as an embodiment, in the time-domain scheduling unit, the physical resource for transmitting the uplink control signal includes at least one physical resource region, and different physical resource regions are used to transmit uplink control signals of different types.

Alternatively, as an embodiment, each of the at least one physical resource region consists of at least one frequency-domain RB in frequency domain.

Alternatively, as an embodiment, the uplink control signal includes uplink control signals of different types, the physical resource for transmitting the uplink control signal is an RB, the RB includes the at least one physical resource region and different physical resource regions are used to transmit the uplink control signals of different types.

Alternatively, as an embodiment, the at least one physical resource region includes a first physical resource region, and a first OFDM symbol of the first physical resource region in time domain is a starting OFDM symbol in the time-domain scheduling unit.

Alternatively, as an embodiment, the at least one physical resource region further includes a second physical resource region, and the second physical resource region and the first physical resource region are continuous in the time domain.

Alternatively, as an embodiment, the at least one physical resource region includes a third physical resource region, and a last OFDM symbol of the third physical resource region in the time domain is a last OFDM symbol in the time-domain scheduling unit.

Alternatively, as an embodiment, the device further includes a second determination module, configured to determine a physical resource used by a terminal for transmitting a reference signal in the time-domain scheduling unit, the physical resource for transmitting the reference signals being configured in one of the at least one physical resource region.

Alternatively, as an embodiment, the physical resources for transmitting the reference signals are distributed in the frequency domain or a time domain, or the physical resources for transmitting the reference signals are continuous in the frequency domain or the time domain.

Alternatively, as an embodiment, the uplink control signal includes multiple ACK/NACK signals, in the first physical resource region, physical resources for transmitting the multiple ACK/NACK signals and the physical resources for transmitting the reference signals are not overlapped, and physical resources in a resource group for transmitting the multiple ACK/NACK signals and the physical resources for transmitting the reference signals are staggered and continuously arranged in a same OFDM symbol.

Alternatively, as an embodiment, the multiple ACK/NACK signals are superposed and mapped onto the resource group for transmitting the multiple ACK/NACK signals after being extended by use of different orthogonal or pseudo-orthogonal sequences with a same length respectively.

Alternatively, as an embodiment, the uplink control signal further includes a CSI feedback signal, a physical resource for transmitting the CSI feedback signal and physical resources for transmitting the reference signals in the second physical resource transmission region are not overlapped, and the physical resources in the resource group for transmitting the reference signals are continuous in the time domain.

Alternatively, as an embodiment, in the first physical resource transmission region, the multiple ACK/NACK signals are repeatedly mapped, for a transmission times of the multiple ACK/NACK signals, onto resource groups at different positions after being extended and superposed by use of different orthogonal or pseudo-orthogonal sequences with a same length respectively, and the resource groups include the physical resources for transmitting the multiple ACK/NACK signals.

Alternatively, as an embodiment, the uplink control signal includes the multiple ACK/NACK signals, in the third physical resource region, the physical resources for transmitting the multiple ACK/NACK signals and the physical resources for transmitting the reference signals are not overlapped, and the physical resources in the resource group for transmitting the multiple ACK/NACK signals and the physical resources for transmitting the reference signals are staggered and continuously arranged in a same OFDM symbol.

Alternatively, as an embodiment, in the third physical resource transmission region, the multiple ACK/NACK signals are repeatedly mapped, for the transmission times of the multiple ACK/NACK signals, onto resource groups at different positions after being extended and superposed by use of different orthogonal or pseudo-orthogonal sequences with a same length respectively, and the resource groups include the physical resources for transmitting the multiple ACK/NACK signals.

Alternatively, as an embodiment, the multiple ACK/NACK signals correspond to downlink data blocks in different time-domain scheduling units respectively, or the multiple ACK/NACK signals correspond to different codewords of a same downlink data block.

Alternatively, as an embodiment, the device further includes a transmitting module, configured to transmit indication information to the terminal, the indication information being used to indicate the physical resource for transmitting the uplink control signal in the time-domain scheduling unit.

Alternatively, as an embodiment, the transmitting module is specifically configured to transmit the indication information to the terminal, the indication information being used to indicate frequency-domain resource configuration and time-domain resource configuration of the physical resource for transmitting the uplink control signal in the time-domain scheduling unit.

Alternatively, as an embodiment, the indication information is further used to indicate a physical resource used by the terminal for transmitting uplink data in the time-domain scheduling unit.

Alternatively, as an embodiment, the transmitting module is further specifically configured to transmit high-layer signaling or physical-layer signaling to the terminal, the high-layer signaling or the physical-layer signaling carrying the indication information.

Alternatively, as an embodiment, the device further includes a third determination module, configured to determine a transmission times needed for transmission of the uplink control signal and/or a length of an extended sequence of the uplink control signal; and an indication module, used to indicate the transmission times needed for transmission of the uplink control signal and/or the length of the extended sequence of the uplink control signal to the terminal.

Alternatively, as an embodiment, the indication module is specifically configured to transmit a length of a sequence of the uplink control signal to the terminal; and transmit a number of the physical resource for transmitting the uplink control signal to the terminal.

Alternatively, as an embodiment, the indication module is further specifically configured to transmit DCI to the terminal, the DCI carrying the transmission times needed for transmission of the uplink control signal and/or the length of the extended sequence of the uplink control signal.

Alternatively, as an embodiment, the indication module is further specifically configured to transmit high-layer signaling to the terminal, the high-layer signaling carrying a transmission times needed for transmission of a first-type uplink signal and/or a length of an extended sequence of the first-type uplink signal.

Figure 13:
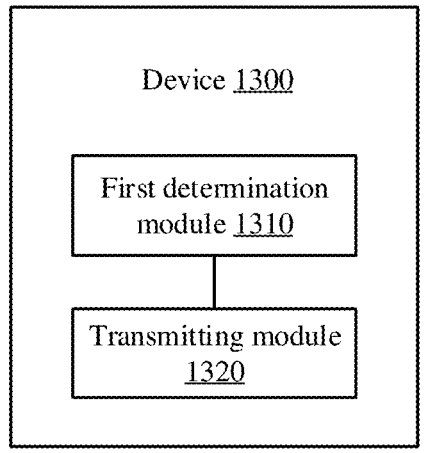
FIG. 13 illustrates a schematic block diagram of a device for transmitting an uplink control signal according to another embodiment of the disclosure.

FIG. 13 illustrates a schematic block diagram of a device for transmitting an uplink control signal according to another embodiment of the disclosure. The device 1300 illustrated in FIG. 13 includes a first determination module 1310 and a transmitting module 1320.

The first determination module 1310 is configured to determine a physical resource for transmitting an uplink control signal in a time-domain scheduling unit.

The transmitting module 1320 is configured to transmit the uplink control signal to a network device on the physical resource for transmitting the uplink control signal, the uplink control signal being transmitted by use of a CP-OFDM waveform.

Alternatively, as an embodiment, the physical resource for transmitting the uplink control signal in the time-domain scheduling unit includes at least one physical resource region, and different physical resource regions are used to transmit uplink control signals of different types.

Alternatively, as an embodiment, each of the at least one physical resource region consists of at least one frequency-domain RB in frequency domain.

Alternatively, as an embodiment, the uplink control signal includes uplink control signals of different types, the physical resource for transmitting the uplink control signals is an RB, the RB includes the at least one physical resource region, and different physical resource regions are used to transmit the uplink control signals of different types.

Alternatively, as an embodiment, the at least one physical resource region includes a first physical resource region, and a first OFDM symbol of the first physical resource region in time domain is a starting OFDM symbol in the time-domain scheduling unit.

Alternatively, as an embodiment, the at least one physical resource region further includes a second physical resource region, and the second physical resource region and the first physical resource region are continuous in the time domain.

Alternatively, as an embodiment, the at least one physical resource region includes a third physical resource region, and a last OFDM symbol of the third physical resource region in the time domain is a last OFDM symbol in the time-domain scheduling unit.

Alternatively, as an embodiment, physical resources for transmitting reference signals are configured in one of the at least one physical resource region.

Alternatively, as an embodiment, the physical resource for transmitting the reference signals are distributed in the frequency domain or a time domain, or the physical resource for transmitting the reference signals are continuous in at least one of the frequency domain or the time domain.

Alternatively, as an embodiment, the uplink control signal includes multiple ACK/NACK signals, in the first physical resource region, physical resources for transmitting the multiple ACK/NACK signals and the physical resources for transmitting the reference signals are not overlapped, and physical resources in a resource group for transmitting the multiple ACK/NACK signals and the physical resources for transmitting the reference signals are staggered and continuously arranged in a same OFDM symbol.

Alternatively, as an embodiment, the device further includes a first mapping module, configured to extend the multiple ACK/NACK signals by use of different orthogonal or pseudo-orthogonal sequences with a same length and map and superpose the extended sequences into the resource group.

Alternatively, as an embodiment, the uplink control signal further includes a CSI feedback signal, in the second physical resource transmission region, a physical resource for transmitting the CSI feedback signal and physical resource for transmitting the reference signals are not overlapped, and the physical resource in the resource group for transmitting the reference signals are continuous in the time domain.

Alternatively, as an embodiment, the device further includes a second mapping module, configured to extend the multiple ACK/NACK signals by use of different orthogonal or pseudo-orthogonal sequences with a same length to repeatedly map the extended sequences onto resource groups at different positions for the transmission times of the multiple ACK/NACK signals, the resource groups including the physical resources for transmitting the multiple ACK/NACK signals.

Alternatively, as an embodiment, the uplink control signal includes the multiple ACK/NACK signals, in the third physical resource region, the physical resources for transmitting the multiple ACK/NACK signals and the physical resources for transmitting the reference signals are not overlapped, and the physical resources in the resource group for transmitting the multiple ACK/NACK signals and the physical resources for transmitting the reference signals are staggered and continuously arranged in a same OFDM symbol.

Alternatively, as an embodiment, in the third physical resource transmission region, the multiple ACK/NACK signals are repeatedly mapped, for the transmission times of the multiple ACK/NACK signals, onto resource groups at different positions after being extended and superposed by use of different orthogonal or pseudo-orthogonal sequences with a same length respectively, and the resource groups include the physical resources for transmitting the multiple ACK/NACK signals.

Alternatively, as an embodiment, the multiple ACK/NACK signals correspond to downlink data blocks in different time-domain scheduling units respectively, or the multiple ACK/NACK signals correspond to different codewords of a same downlink data block.

Alternatively, as an embodiment, the first determination module is configured to receive indication information transmitted by the network device, the indication information being used to indicate the physical resource for transmitting the uplink control signal in the time-domain scheduling unit.

Alternatively, as an embodiment, the first determination module is specifically configured to receive the indication information transmitted by the network device, the indication information being used to indicate frequency-domain resource configuration and time-domain resource configuration of the physical resource for transmitting the uplink control signal in the time-domain scheduling unit.

Alternatively, as an embodiment, the indication information is further used to indicate a physical resource used by the terminal for transmitting uplink data in the time-domain scheduling unit.

Alternatively, as an embodiment, the first determination module is further specifically configured to receive high-layer signaling or physical-layer signaling transmitted by the network device, the high-layer signaling or the physical-layer signaling carrying the indication information.

Alternatively, as an embodiment, the device further includes a second determination module, configured to determine a transmission times needed for transmission of the uplink control signal and/or a length of an extended sequence of the uplink control signal according to an indication of the network device; and the transmitting module is specifically configured to transmit the uplink control signal to the network device on the physical resource for transmitting the uplink control signal according to the transmission times needed for transmission of the uplink control signal and/or the length of the extended sequence of the uplink control signal.

Alternatively, as an embodiment, the second determination module is further specifically configured to receive a length of a sequence of the uplink control signal from the network device, receive a number of the physical resource for transmitting the uplink control signal from the network device, and determine the transmission times needed for transmission of the uplink control signal according to the sequence length of the uplink control signal and the number of the physical resource for transmitting the uplink control signal.

Alternatively, as an embodiment, the second determination module is further specifically configured to receive DCI transmitted by the network device, the DCI carrying the transmission times needed for transmission of the uplink control signal and/or the length of the extended sequence of the uplink control signal.

Alternatively, as an embodiment, the second determination module is further specifically configured to receive high-layer signaling transmitted by the network device, the high-layer signaling carrying a transmission times needed for transmission of a first-type uplink signal and/or a length of an extended sequence of the first-type uplink signal.

Figure 14:
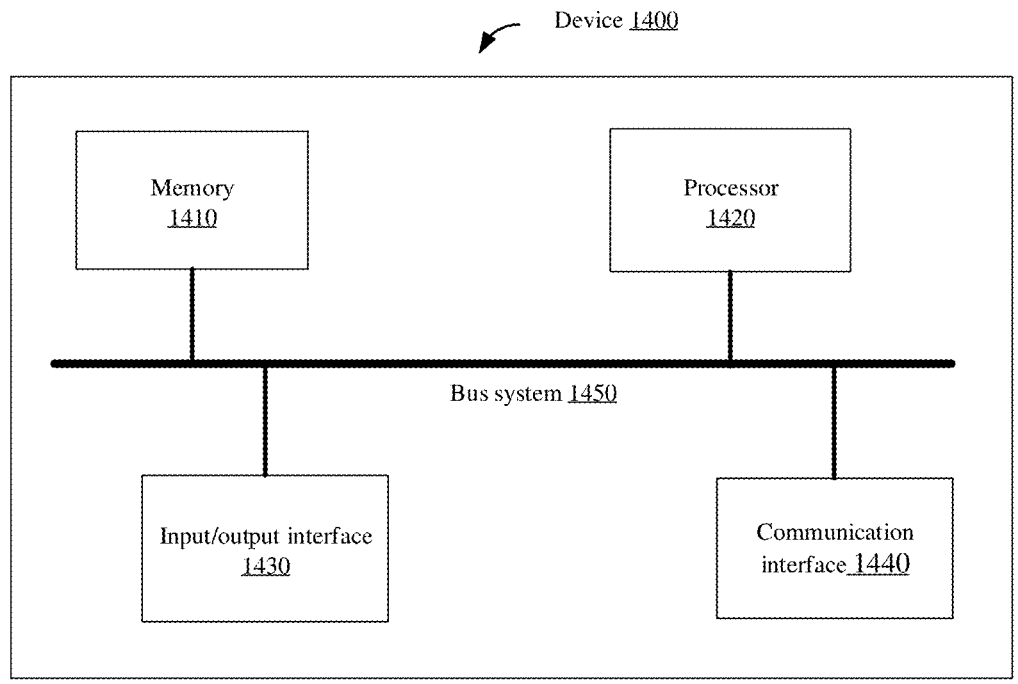
FIG. 14 illustrates a schematic block diagram of a device for transmitting an uplink signal according to another embodiment of the disclosure.

FIG. 14 illustrates a schematic block diagram of a device for transmitting an uplink signal according to another embodiment of the disclosure. FIG. 14 is the schematic block diagram of a beam measurement device according to the embodiment of the disclosure. The data transmission device 1400 illustrated in FIG. 14 includes a memory 1410, a processor 1420, an input/output interface 1430, a communication interface 1440 and a bus system 1450. The memory 1410, the processor 1420, the input/output interface 1430 and the communication interface 1440 are connected through the bus system 1450. The memory 1410 is configured to store an instruction. The processor 1420 is configured to execute the instruction stored in the memory 1410 to control the input/output interface 1430 to receive input data and information and output data such as an operation result, and control the communication interface 1440 to transmit a signal.

The processor 1420 is configured to determine a physical resource for transmitting an uplink control signal in a time-domain scheduling unit.

The communication interface 1440 receives the uplink control signal on the physical resource for transmitting the uplink control signal, the uplink control signal being transmitted by use of a CP-OFDM waveform.

It is to be understood that, in the embodiment of the disclosure, the processor 1420 may adopt a universal Central Processing Unit (CPU), a microprocessor, an Application Specific Integrated Circuit (ASIC) or one or more integrated circuits, and is configured to execute a related program to implement the technical solution provided in the embodiment of the disclosure.

It is also to be understood that the communication interface 1440 uses, for example, but not limited to, a transceiver device such as a transceiver to implement communication between the signal detection device 1400 and another device or a communication network.

The memory 1410 may include a Read-Only Memory (ROM) and a Random Access Memory (RAM) and provides an instruction and data for the processor 1420. A part of the memory 1410 may further include a nonvolatile RAM. For example, the memory 1410 may further store information of a device type.

The bus system 1450 includes a data bus, and may further include a power bus, a control bus, a state signal bus and the like. However, for clear description, various buses in the figure are marked as the bus system 1450.

In an implementation process, each step of the method may be completed by an integrated logic circuit of hardware in the processor 1420 or an instruction in a software form. The actions of the uplink signal transmission method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory 1410. The processor 1420 reads information in the memory 1410 and completes the actions of the method in combination with hardware. No more detailed descriptions will be made herein to avoid repetitions.

Alternatively, as an embodiment, the physical resource for transmitting the uplink control signal in the time-domain scheduling unit includes at least one physical resource region and different physical resource regions are used to transmit uplink control signals of different types.

Alternatively, as an embodiment, each of the at least one physical resource region consists of at least one frequency-domain RB in frequency domain.

Alternatively, as an embodiment, the uplink control signal includes uplink control signals of different types, the physical resource for transmitting the uplink control signals is an RB, the RB includes the at least one physical resource region and different physical resource regions are used to transmit the uplink control signals of different types.

Alternatively, as an embodiment, the at least one physical resource region includes a first physical resource region, and a first OFDM symbol of the first physical resource region in time domain is a starting OFDM symbol in the time-domain scheduling unit.

Alternatively, as an embodiment, the at least one physical resource region further includes a second physical resource region, and the second physical resource region and the first physical resource region are continuous in the time domain.

Alternatively, as an embodiment, the at least one physical resource region includes a third physical resource region, and a last OFDM symbol of the third physical resource region in the time domain is a last OFDM symbol in the time-domain scheduling unit.

Alternatively, as an embodiment, the processor is further configured to determine a physical resource used by a terminal for transmitting reference signals in the time-domain scheduling unit, the physical resource for transmitting the reference signals being configured in one of the at least one physical resource region.

Alternatively, as an embodiment, the physical resources for transmitting the reference signals are distributed in the frequency domain or a time domain, or the physical resources for transmitting the reference signals are continuous in the frequency domain or the time domain.

Alternatively, as an embodiment, the uplink control signal includes multiple ACK/NACK signals, in the first physical resource region, physical resources for transmitting the multiple ACK/NACK signals and the physical resources for transmitting the reference signals are not overlapped, and physical resources in a resource group for transmitting the multiple ACK/NACK signals and the physical resources for transmitting the reference signals are staggered and continuously arranged in a same OFDM symbol.

Alternatively, as an embodiment, the multiple ACK/NACK signals are superposed and mapped onto the resource group for transmitting the multiple ACK/NACK signals after being extended by use of different orthogonal or pseudo-orthogonal sequences with a same length respectively.

Alternatively, as an embodiment, the uplink control signal further includes a CSI feedback signal, a physical resource for transmitting the CSI feedback signal and physical resources for transmitting the reference signals in the second physical resource transmission region are not overlapped, and the physical resources in the resource group for transmitting the reference signals are continuous in the time domain.

Alternatively, as an embodiment, in the first physical resource transmission region, the multiple ACK/NACK signals are repeatedly mapped, for a transmission times of the multiple ACK/NACK signals, onto resource groups at different positions after being extended and superposed by use of different orthogonal or pseudo-orthogonal sequences with a same length respectively, and the resource groups include the physical resources for transmitting the multiple ACK/NACK signals.

Alternatively, as an embodiment, the uplink control signal includes the multiple ACK/NACK signals, in the third physical resource region, the physical resources for transmitting the multiple ACK/NACK signals and the physical resources for transmitting the reference signals are not overlapped, and the physical resources in the resource group for transmitting the multiple ACK/NACK signals and the physical resources for transmitting the reference signals are staggered and continuously arranged in a same OFDM symbol.

Alternatively, as an embodiment, in the third physical resource transmission region, the multiple ACK/NACK signals are repeatedly mapped, for the transmission times of the multiple ACK/NACK signals, onto resource groups at different positions after being extended and superposed by use of different orthogonal or pseudo-orthogonal sequences with a same length respectively, and the resource groups include the physical resources for transmitting the multiple ACK/NACK signals.

Alternatively, as an embodiment, the multiple ACK/NACK signals correspond to downlink data blocks in different time-domain scheduling units respectively, or the multiple ACK/NACK signals correspond to different codewords of a same downlink data block.

Alternatively, as an embodiment, the communication interface is further configured to transmit indication information to the terminal, the indication information being used to indicate the physical resource for transmitting the uplink control signal in the time-domain scheduling unit.

Alternatively, as an embodiment, the communication interface is specifically configured to transmit the indication information to the terminal, the indication information being used to indicate frequency-domain resource configuration and time-domain resource configuration of the physical resource for transmitting the uplink control signal in the time-domain scheduling unit.

Alternatively, as an embodiment, the indication information is further used to indicate a physical resource used by the terminal for transmitting uplink data in the time-domain scheduling unit.

Alternatively, as an embodiment, the communication interface is further specifically configured to transmit high-layer signaling or physical-layer signaling to the terminal, the high-layer signaling or the physical-layer signaling carrying the indication information.

Alternatively, as an embodiment, the device further includes the processor, further configured to determine a transmission times needed for transmission of the uplink control signal and/or a length of an extended sequence of the uplink control signal; and the communication interface, used to indicate the transmission times needed for transmission of the uplink control signal and/or the length of the extended sequence of the uplink control signal to the terminal.

Alternatively, as an embodiment, the communication interface is specifically configured to transmit a length of a sequence of the uplink control signal to the terminal; and transmit a number of the physical resource for transmitting the uplink control signal to the terminal.

Alternatively, as an embodiment, the communication interface is further specifically configured to transmit DCI to the terminal, the DCI carrying the transmission times needed for transmission of the uplink control signal and/or the length of the extended sequence of the uplink control signal.

Alternatively, as an embodiment, the communication interface is further specifically configured to transmit high-layer signaling to the terminal, the high-layer signaling carrying a transmission times needed for transmission of a first-type uplink signal and/or a length of an extended sequence of the first-type uplink signal.

Figure 15:
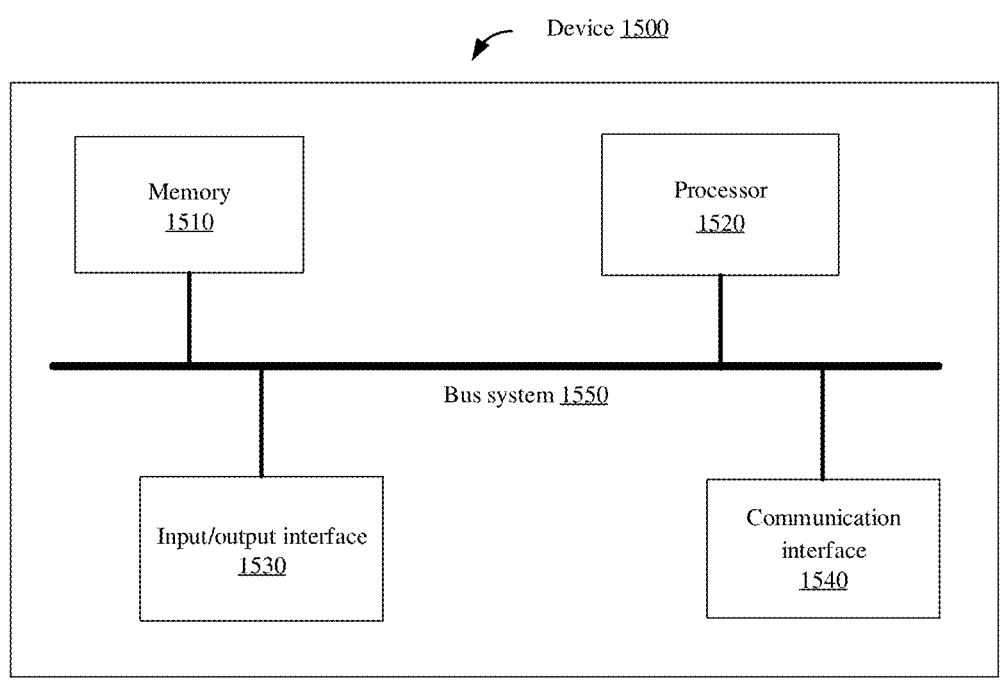
FIG. 15 illustrates a schematic block diagram of a device for transmitting an uplink signal according to another embodiment of the disclosure.

FIG. 15 illustrates a schematic block diagram of a device for transmitting an uplink signal according to another embodiment of the disclosure. FIG. 15 is the schematic block diagram of a beam measurement device according to the embodiment of the disclosure. The data transmission device 1500 illustrated in FIG. 15 includes a memory 1510, a processor 1520, an input/output interface 1530, a communication interface 1540 and a bus system 1550. The memory 1510, the processor 1520, the input/output interface 1530 and the communication interface 1540 are connected through the bus system 1550. The memory 1510 is configured to store an instruction. The processor 1520 is configured to execute the instruction stored in the memory 1510 to control the input/output interface 1530 to receive input data and information and output data such as an operation result and control the communication interface 1540 to transmit a signal.

The processor 1520 is configured to determine a physical resource for transmitting an uplink control signal in a time-domain scheduling unit.

The communication interface 1540 is configured to transmit the uplink control signal to a network device on the physical resource for transmitting the uplink control signal, the uplink control signal being transmitted by use of a CP-OFDM waveform.

It is to be understood that, in the embodiment of the disclosure, the processor 1520 may adopt a universal CPU, a microprocessor, an ASIC or one or more integrated circuits, and is configured to execute a related program to implement the technical solution provided in the embodiment of the disclosure.

It is also to be understood that the communication interface 1540 uses, for example, but not limited to, a transceiver device such as a transceiver to implement communication between the signal detection device 1500 and another device or a communication network.

The memory 1510 may include a ROM and a RAM and provides an instruction and data for the processor 1520. A part of the memory 1510 may further include a nonvolatile RAM. For example, the memory 1510 may further store information of a device type.

The bus system 1550 includes a data bus, and may further include a power bus, a control bus, a state signal bus and the like. However, for clear description, various buses in the figure are marked as the bus system 1550.

In an implementation process, each step of the method may be completed by an integrated logic circuit of hardware in the processor 1520 or an instruction in a software form. The actions of the uplink signal transmission method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory 1510. The processor 1520 reads information in the memory 1510 and completes the actions of the method in combination with hardware. No more detailed descriptions will be made herein to avoid repetitions.

Alternatively, as an embodiment, the physical resource for transmitting the uplink control signal in the time-domain scheduling unit includes at least one physical resource region, and different physical resource regions are used to transmit uplink control signals of different types.

Alternatively, as an embodiment, each of the at least one physical resource region consists of at least one frequency-domain RB in frequency domain.

Alternatively, as an embodiment, the uplink control signal includes uplink control signals of different types, the physical resource for transmitting the uplink control signals is an RB, the RB includes the at least one physical resource region and different physical resource regions are used to transmit the uplink control signals of different types.

Alternatively, as an embodiment, the at least one physical resource region includes a first physical resource region, and a first OFDM symbol of the first physical resource region in time domain is a starting OFDM symbol in the time-domain scheduling unit.

Alternatively, as an embodiment, the at least one physical resource region further includes a second physical resource region, and the second physical resource region and the first physical resource region are continuous in the time domain.

Alternatively, as an embodiment, the at least one physical resource region includes a third physical resource region, and a last OFDM symbol of the third physical resource region in the time domain is a last OFDM symbol in the time-domain scheduling unit.

Alternatively, as an embodiment, physical resources for transmitting reference signals are configured in one of the at least one physical resource region.

Alternatively, as an embodiment, the physical resources for transmitting the reference signals are distributed in the frequency domain or a time domain, or the physical resources for transmitting the reference signals are continuous in the frequency domain or the time domain.

Alternatively, as an embodiment, the uplink control signal includes multiple ACK/NACK signals, in the first physical resource region, physical resources for transmitting the multiple ACK/NACK signals and the physical resources for transmitting the reference signals are not overlapped, and physical resources in a resource group for transmitting the multiple ACK/NACK signals and the physical resources for transmitting the reference signals are staggered and continuously arranged in a same OFDM symbol.

Alternatively, as an embodiment, the processor is configured to extend the multiple ACK/NACK signals by use of different orthogonal or pseudo-orthogonal sequences with a same length and map and superpose the extended sequences onto the resource group.

Alternatively, as an embodiment, the uplink control signal further includes a CSI feedback signal, in the second physical resource transmission region, a physical resource for transmitting the CSI feedback signal and physical resources for transmitting the reference signals are not overlapped, and the physical resource in the resource group for transmitting the reference signals are continuous in the time domain.

Alternatively, as an embodiment, the processor is configured to extend the multiple ACK/NACK signals by use of different orthogonal or pseudo-orthogonal sequences with a same length to repeatedly map the extended sequences onto resource groups at different positions for the transmission times of the multiple ACK/NACK signals, the resource groups including the physical resources for transmitting the multiple ACK/NACK signals.

Alternatively, as an embodiment, the uplink control signal includes the multiple ACK/NACK signals, in the third physical resource region, the physical resources for transmitting the multiple ACK/NACK signals and the physical resources for transmitting the reference signals are not overlapped, and the physical resource in the resource group for transmitting the multiple ACK/NACK signals and the physical resources for transmitting the reference signals are staggered and continuously arranged in a same OFDM symbol.

Alternatively, as an embodiment, in the third physical resource transmission region, the multiple ACK/NACK signals are repeatedly mapped, for the transmission times of the multiple ACK/NACK signals, onto resource groups at different positions after being extended and superposed by use of different orthogonal or pseudo-orthogonal sequences with a same length respectively, and the resource groups include the physical resources for transmitting the multiple ACK/NACK signals.

Alternatively, as an embodiment, the multiple ACK/NACK signals correspond to downlink data blocks in different time-domain scheduling units respectively, or the multiple ACK/NACK signals correspond to different codewords of a same downlink data block.

Alternatively, as an embodiment, the processor is configured to receive indication information transmitted by the network device, the indication information being used to indicate the physical resource for transmitting the uplink control signal in the time-domain scheduling unit.

Alternatively, as an embodiment, the processor is specifically configured to receive the indication information transmitted by the network device, the indication information being used to indicate frequency-domain resource configuration and time-domain resource configuration of the physical resource for transmitting the uplink control signal in the time-domain scheduling unit.

Alternatively, as an embodiment, the indication information is further used to indicate a physical resource used by the terminal for transmitting uplink data in the time-domain scheduling unit.

Alternatively, as an embodiment, the processor is further specifically configured to receive high-layer signaling or physical-layer signaling transmitted by the network device, the high-layer signaling or the physical-layer signaling carrying the indication information.

Alternatively, as an embodiment, the processor is configured to determine a transmission times needed for transmission of the uplink control signal and/or a length of an extended sequence of the uplink control signal according to an indication of the network device; and the communication interface is specifically configured to transmit the uplink control signal to the network device on the physical resource for transmitting the uplink control signal according to the transmission times needed for transmission of the uplink control signal and/or the length of the extended sequence of the uplink control signal.

Alternatively, as an embodiment, the processor is further specifically configured to receive a length of a sequence of the uplink control signal from the network device, receive a number of the physical resource for transmitting the uplink control signal from the network device and determine the transmission times needed for transmission of the uplink control signal according to the sequence length of the uplink control signal and the number of the physical resource for transmitting the uplink control signal.

Alternatively, as an embodiment, the processor is further specifically configured to receive DCI transmitted by the network device, the DCI carrying the transmission times needed for transmission of the uplink control signal and/or the length of the extended sequence of the uplink control signal.

Alternatively, as an embodiment, the processor is further specifically configured to receive high-layer signaling transmitted by the network device, the high-layer signaling carrying a transmission times needed for transmission of a first-type uplink signal and/or a length of an extended sequence of the first-type uplink signal.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

In some embodiments provided by the application, it is to be understood that the disclosed system, device and method may be implemented in another manner For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to a conventional art or part of the technical solutions may be embodied in form of software product, and the computer software product is stored in a storage medium, including a plurality of instructions configured to enable a computer device (which may be a personal computer, a server, a network device or the like) to execute all or part of the actions of the method in each embodiment of the disclosure. The abovementioned storage medium includes: various media capable of storing program codes such as a U disk, a mobile hard disk, a ROM, a RAM, a magnetic disk or an optical disk.

The invention claimed is:

1. A method for receiving an uplink control signal, comprising:
    determining, by a network device, a plurality of time-frequency resources for transmitting the uplink control signal in a time-domain scheduling unit; and
    receiving, by the network device, the uplink control signal from a terminal on the plurality of time-frequency resources for transmitting the uplink control signal, the uplink control signal being transmitted by use of a Cyclic Prefix-Orthogonal Frequency Division Multiplexing (CP-OFDM) waveform;
    wherein the time-domain scheduling unit comprises different physical resource regions used to transmit uplink control signals of different types, and the plurality of time-frequency resources for transmitting the uplink control signal in the time-domain scheduling unit are arranged into one or more of the different physical resource regions;
    the one or more physical resource regions comprise a first physical resource region for transmitting uplink control signals of the type Acknowledgement (ACK)/Negative Acknowledgement (NACK), and a second physical resource region for transmitting uplink control signals of the type Channel State Information (CSI) feedback;
    wherein time-frequency resources for transmitting uplink control signals of the type reference signal are configured into multiple resource groups, wherein the multiple resource groups are allocated in one of the first physical resource region or the second physical resource region of the time-domain scheduling unit; wherein each resource group occupies one or more continuous time-frequency resources, the multiple resource groups are non-contiguously allocated in frequency domain of the time-domain scheduling unit, and the time-domain scheduling unit is a slot;
    wherein the uplink control signal comprises multiple Acknowledgement (ACK)/Negative Acknowledgement (NACK) signals, and
    when time-frequency resources for transmitting the reference signals are configured in the first physical resource region, in the first physical resource region, time-frequency resources for transmitting the multiple ACK/NACK signals and the time-frequency resources for transmitting the reference signals are not overlapped, and the time-frequency resources in a resource group for transmitting the multiple ACK/NACK signals and the time-frequency resources for transmitting the reference signals are staggered and continuously arranged in a same OFDM symbol.

2. The method of claim 1, wherein the different physical resource regions further comprise a third physical resource region,
    wherein the first, second, and third physical resource regions are overlapped, or
    wherein the first, second, and third physical resource regions are continuous in time domain.

3. The method of claim 1, wherein the second physical resource region and the first physical resource region are continuous in time domain.

4. The method of claim 2, wherein a last OFDM symbol of the third physical resource region in the time domain is a last OFDM symbol in the time-domain scheduling unit.

5. The method of claim 1, wherein the uplink control signal comprises the multiple ACK/NACK signals,
    in the third physical resource region, the time-frequency resources for transmitting the multiple ACK/NACK signals and time-frequency resources for transmitting the reference signals are not overlapped.

6. The method of claim 1, wherein the multiple ACK/NACK signals correspond to downlink data blocks in different time-domain scheduling units respectively, or
    the multiple ACK/NACK signals correspond to different codewords of a same downlink data block.

7. The method of claim 1, wherein before receiving, by the network device, the uplink control signal from the terminal on the physical resource for transmitting the uplink control signal, further comprising:
    transmitting, by the network device, indication information to the terminal, the indication information being used to indicate the time-frequency resource for transmitting the uplink control signal in the time-domain scheduling unit.

8. The method of claim 7, wherein the indication information is further used to indicate a time-frequency resource used by the terminal for transmitting uplink data in the time-domain scheduling unit.

9. The method of claim 1, wherein the time-frequency resources comprise resource elements (REs).

10. The method of claim 1, wherein each of the physical resource regions comprises resource elements (REs) continuous in frequency region, and a plurality of Orthogonal Frequency Division Multiplexing (OFDM) signals.

11. A method for receiving an uplink control signal, comprising:
- determining, by a network device, a plurality of time-frequency resources for transmitting the uplink control signal in a time-domain scheduling unit; and
- receiving, by the network device, the uplink control signal from a terminal on the plurality of time-frequency resources for transmitting the uplink control signal, the uplink control signal being transmitted by use of a Cyclic Prefix-Orthogonal Frequency Division Multiplexing (CP-OFDM) waveform;
- wherein the time-domain scheduling unit comprises different physical resource regions used to transmit uplink control signals of different types, and the plurality of time-frequency resources for transmitting the uplink control signal in the time-domain scheduling unit are arranged into one or more of the different physical resource regions;
- the one or more physical resource regions comprise a first physical resource region for transmitting uplink control signals of the type Acknowledgement (ACK)/Negative Acknowledgement (NACK), and a second physical resource region for transmitting uplink control signals of the type Channel State Information (CSI) feedback;
- wherein time-frequency resources for transmitting uplink control signals of the type reference signal are configured into multiple resource groups, wherein the multiple resource groups are allocated in one of the first physical resource region or the second physical resource region of the time-domain scheduling unit; wherein each resource group occupies one or more continuous time-frequency resources, the multiple resource groups are non-contiguously allocated in frequency domain of the time-domain scheduling unit, and the time-domain scheduling unit is a slot;
- wherein the uplink control signal further comprises a Channel State Information (CSI) feedback signal, and
- when time-frequency resources for transmitting the reference signals are configured in the second physical resource region, in the second physical resource region, a time-frequency resource for transmitting the CSI feedback signal and the time-frequency resources for transmitting the reference signals are not overlapped, and the time-frequency resources in the resource group for transmitting the reference signals are continuous in the time domain.

12. A device for receiving an uplink control signal, comprising:
- a processor, configured to determine a plurality of time-frequency resources for transmitting the uplink control signal in a time-domain scheduling unit; and
- a communication interface, configured to receive the uplink control signal from a terminal on the plurality of time-frequency resources for transmitting the uplink control signal, the uplink control signal being transmitted by use of a Cyclic Prefix-Orthogonal Frequency Division Multiplexing (CP-OFDM) waveform;
- wherein the time-domain scheduling unit comprises different physical resource regions used to transmit uplink control signals of different types, and the plurality of time-frequency resources for transmitting the uplink control signal in the time-domain scheduling unit are arranged into one or more of the different physical resource regions;
- the one or more physical resource regions comprise a first physical resource region for transmitting uplink control signals of the type Acknowledgement (ACK)/Negative Acknowledgement (NACK), and a second physical resource region for transmitting uplink control signals of the type Channel State Information (CSI) feedback;
- wherein time-frequency resources for transmitting uplink control signals of the type reference signal are configured into multiple resource groups, wherein the multiple resource groups are allocated in one of the first physical resource region or the second physical resource region of the time-domain scheduling unit; wherein each resource group occupies one or more continuous time-frequency resources, the multiple resource groups are non-contiguously allocated in frequency domain of the time-domain scheduling unit, and the time-domain scheduling unit is a slot;
- wherein the uplink control signal comprises multiple Acknowledgement (ACK)/Negative Acknowledgement (NACK) signals, and
- when time-frequency resources for transmitting the reference signals are configured in the first physical resource region, in the first physical resource region, time-frequency resources for transmitting the multiple ACK/NACK signals and the time-frequency resources for transmitting the reference signals are not overlapped, and the time-frequency resources in a resource group for transmitting the multiple ACK/NACK signals and the time-frequency resources for transmitting the reference signals are staggered and continuously arranged in a same OFDM symbol.

13. The device of claim 12, wherein the different physical resource regions further comprise a third physical resource region,
- wherein the first, second, and third physical resource regions are overlapped, or
- wherein the first, second, and third physical resource regions are continuous in time domain.

14. The device of claim 12, wherein the second physical resource region and the first physical resource region are continuous in time domain.

15. The device of claim 13, wherein a last OFDM symbol of the third physical resource region in the time domain is a last OFDM symbol in the time-domain scheduling unit.

16. The device of claim 12, wherein the uplink control signal comprises the multiple ACK/NACK signals,
- in the third physical resource region, the time-frequency resources for transmitting the multiple ACK/NACK signals and time-frequency resources for transmitting the reference signals are not overlapped.

17. The device of claim 12, wherein the multiple ACK/NACK signals correspond to downlink data blocks in different time-domain scheduling units respectively, or
- the multiple ACK/NACK signals correspond to different codewords of a same downlink data block.

18. The device of claim 12, wherein the communication interface is further configured to:
- transmit indication information to the terminal, the indication information being used to indicate the time-frequency resource for transmitting the uplink control signal in the time-domain scheduling unit.

19. The device of claim 18, wherein the indication information is further used to indicate a time-frequency resource used by the terminal for transmitting uplink data in the time-domain scheduling unit.

20. The device of claim 12, wherein each of the physical resource regions comprises resource elements (REs) continuous in frequency region, and a plurality of Orthogonal Frequency Division Multiplexing (OFDM) signals.

* * * * *